United States Patent
Cannata et al.

(10) Patent No.: US 11,256,649 B2
(45) Date of Patent: Feb. 22, 2022

(54) MACHINE TEMPLATES FOR PREDETERMINED COMPUTE UNITS

(71) Applicant: Liqid Inc., Broomfield, CO (US)

(72) Inventors: James Scott Cannata, Denver, CO (US); Phillip Clark, Boulder, CO (US); Sumit Puri, Calabasas, CA (US); Bryan Schramm, Broomfield, CO (US); Bryan Nagel, Denver, CO (US)

(73) Assignee: Liqid Inc., Broomfield, CO (US)

( * ) Notice: Subject to any disclaimer, the term of this patent is extended or adjusted under 35 U.S.C. 154(b) by 0 days.

(21) Appl. No.: 16/857,941

(22) Filed: Apr. 24, 2020

(65) Prior Publication Data

US 2020/0341930 A1  Oct. 29, 2020

Related U.S. Application Data

(60) Provisional application No. 62/838,492, filed on Apr. 25, 2019.

(51) Int. Cl.
G06F 13/42 (2006.01)
G06F 9/451 (2018.01)

(52) U.S. Cl.
CPC .......... *G06F 13/4221* (2013.01); *G06F 9/451* (2018.02); *G06F 2213/0026* (2013.01)

(58) Field of Classification Search
CPC ................. G06F 13/4221; G06F 9/451; G06F 2213/0026; G06F 9/5077
See application file for complete search history.

(56) References Cited

U.S. PATENT DOCUMENTS

| | | |
|---|---|---|
| 5,828,207 A | 10/1998 | Saadeh |
| 6,061,750 A | 5/2000 | Beardsley et al. |
| 6,208,345 B1 | 3/2001 | Sheard et al. |
| 6,325,636 B1 | 12/2001 | Hipp et al. |
| 7,243,145 B1 | 7/2007 | Poortman |
| 7,260,487 B2 | 8/2007 | Brey et al. |
| 7,505,889 B2 | 3/2009 | Salmonsen et al. |

(Continued)

OTHER PUBLICATIONS

Aragon, Juan L. et al., "Control Speculation For Energy-Efficient Next-Generation Superscalar Processors," IEEE Transactions on Computers, vol. 55, No. 3, pp. 281-291, Mar. 2006.

(Continued)

*Primary Examiner* — Farley Abad

(57) ABSTRACT

Machine templates are described herein that provide for enhanced configuration and deployment of arrangements of physical computing components coupled over a communication fabric. In one example, a method includes presenting a user interface indicating a plurality of templates each specifying at least a predefined arrangement of physical computing components for inclusion in compute units, and receiving a user selection indicating a selected template among the plurality of templates to form a target compute unit. The method includes allocating to the target compute unit a set of physical computing components according to the selected template, and instructing a management entity to establish the target compute unit based at least on logical partitioning within a communication fabric communicatively coupling the set of physical computing components of the target compute unit.

18 Claims, 9 Drawing Sheets

(56) References Cited

U.S. PATENT DOCUMENTS

| | | |
|---|---|---|
| 7,606,960 B2 | 10/2009 | Munguia |
| 7,725,757 B2 | 5/2010 | Padweka et al. |
| 7,877,542 B2 | 1/2011 | Chow et al. |
| 8,125,919 B1 | 2/2012 | Khanka et al. |
| 8,150,800 B2 | 4/2012 | Webman et al. |
| 8,656,117 B1 | 2/2014 | Wong et al. |
| 8,688,926 B2 | 4/2014 | Breakstone et al. |
| 8,880,771 B2 | 11/2014 | Subramaniyan et al. |
| 9,602,437 B1 | 3/2017 | Bernath |
| 10,536,349 B1 | 1/2020 | Hayward |
| 10,652,266 B1 * | 5/2020 | Tautschnig .............. H04L 63/20 |
| 2002/0059428 A1 | 5/2002 | Susai et al. |
| 2003/0110423 A1 | 6/2003 | Helms et al. |
| 2003/0126478 A1 | 7/2003 | Burns et al. |
| 2005/0223136 A1 | 10/2005 | Tanaka et al. |
| 2006/0277206 A1 | 12/2006 | Bailey et al. |
| 2007/0067432 A1 | 3/2007 | Tarui et al. |
| 2007/0093916 A1 | 4/2007 | Sanghvi et al. |
| 2008/0034153 A1 | 2/2008 | Lee et al. |
| 2008/0123559 A1 | 5/2008 | Haviv et al. |
| 2008/0198744 A1 | 8/2008 | Menth |
| 2008/0281938 A1 | 11/2008 | Rai et al. |
| 2008/0288877 A1 | 11/2008 | Latzina et al. |
| 2008/0320121 A1 | 12/2008 | Altaf et al. |
| 2009/0006837 A1 | 1/2009 | Rothman et al. |
| 2009/0100280 A1 | 4/2009 | Lindsay |
| 2009/0132699 A1 * | 5/2009 | Sharma .............. H05K 7/20836 709/224 |
| 2009/0190427 A1 | 7/2009 | Brittain et al. |
| 2009/0193201 A1 | 7/2009 | Brittain et al. |
| 2009/0193203 A1 | 7/2009 | Brittain et al. |
| 2009/0276551 A1 | 11/2009 | Brown et al. |
| 2009/0276773 A1 | 11/2009 | Brown et al. |
| 2010/0049851 A1 * | 2/2010 | Garrison ................ G06F 9/5061 709/226 |
| 2010/0088467 A1 | 4/2010 | Lee et al. |
| 2010/0138768 A1 | 6/2010 | Lonkar et al. |
| 2011/0154101 A1 * | 6/2011 | Merwe ................ G06F 11/3006 714/5.1 |
| 2011/0289510 A1 | 11/2011 | Lin et al. |
| 2011/0299317 A1 | 12/2011 | Shaeffer et al. |
| 2011/0320861 A1 | 12/2011 | Bayer et al. |
| 2012/0030544 A1 | 2/2012 | Fisher-Jeffes |
| 2012/0089854 A1 | 4/2012 | Breakstone et al. |
| 2012/0151118 A1 | 6/2012 | Flynn et al. |
| 2012/0166699 A1 | 6/2012 | Kumar et al. |
| 2012/0210163 A1 | 8/2012 | Cho |
| 2012/0317433 A1 | 12/2012 | Ellis et al. |
| 2013/0132643 A1 | 5/2013 | Huang |
| 2013/0159910 A1 | 6/2013 | Bostic et al. |
| 2013/0185416 A1 | 7/2013 | Larkin et al. |
| 2013/0204933 A1 | 8/2013 | Cardona et al. |
| 2013/0291052 A1 * | 10/2013 | Hadar ................ G06F 21/6218 726/1 |
| 2014/0047166 A1 | 2/2014 | Asnaashar et al. |
| 2014/0056319 A1 | 2/2014 | Hellwig |
| 2014/0059265 A1 | 2/2014 | Iyer et al. |
| 2014/0075235 A1 | 3/2014 | Chandhoke et al. |
| 2014/0103955 A1 | 4/2014 | Avritch et al. |
| 2014/0108846 A1 | 4/2014 | Berke et al. |
| 2014/0365714 A1 | 12/2014 | Sweere et al. |
| 2015/0007127 A1 | 1/2015 | Baldwin et al. |
| 2015/0074322 A1 | 3/2015 | Galles |
| 2015/0120479 A1 * | 4/2015 | Bastien .............. G06Q 30/0603 705/26.1 |
| 2015/0121115 A1 | 4/2015 | Chandra et al. |
| 2015/0186437 A1 | 7/2015 | Molaro |
| 2015/0212755 A1 | 7/2015 | Asnaashar |
| 2015/0304423 A1 | 10/2015 | Satoyama et al. |
| 2015/0373115 A1 | 12/2015 | Breakstone et al. |
| 2016/0197996 A1 | 7/2016 | Barton et al. |
| 2016/0248631 A1 | 8/2016 | Duchesneau |
| 2017/0054603 A1 | 2/2017 | Kulkarni et al. |
| 2017/0118115 A1 | 4/2017 | Tsuji |
| 2018/0046509 A1 | 2/2018 | Arata et al. |
| 2018/0213369 A1 | 7/2018 | Dong et al. |
| 2018/0322081 A1 * | 11/2018 | Breakstone ......... G06F 13/4282 |
| 2020/0133876 A1 * | 4/2020 | Bielski ................ G06F 12/0292 |
| 2020/0174838 A1 * | 6/2020 | Li .......................... G06F 9/5044 |

OTHER PUBLICATIONS

International Application No. PCT/US2017/046602, International Search Report & Written Opinion, 8 pages, dated Oct. 19, 2017.

International Application No. PCT/US2017/046607, International Search Report & Written Opinion, 7 pages, dated Oct. 23, 2017.

Lu, Yingping et al., "Performance Study of iSCSI-Based Storage Subsystems," IEEE Communications Magazine, pp. 76-82, Aug. 2003.

Chung, I-Hsin et al., "Towards A Composable Computer System," HPC Asia 2018, 11 pages, Jan. 28-31, 2018.

International Application No. PCT/US2020/029697, International Search Report & Written Opinion, 9 pages, dated Jul. 9, 2020.

* cited by examiner

MACHINE TEMPLATES FOR PREDETERMINED COMPUTE UNITS

RELATED APPLICATIONS

This application hereby claims the benefit of and priority to U.S. Provisional Patent Application No. 62/838,492, titled "HARDWARE TEMPLATES FOR PREDETERMINED COMPUTE UNITS," filed Apr. 25, 2019, which is hereby incorporated by reference in its entirety.

BACKGROUND

Computer systems typically include bulk storage systems, such as magnetic disk drives, optical storage devices, tape drives, or solid-state storage drives, among other storage systems. As storage needs have increased in these computer systems, networked storage systems have been introduced which store large amounts of data in a storage environment physically separate from end user computer devices. These networked storage systems typically provide access to bulk data storage over one or more network interfaces to end users or other external systems. In addition to storage of data, remote computing systems include various processing systems that can provide remote computing resources to end users. These networked storage systems and remote computing systems can be included in high-density installations, such as rack-mounted environments.

However, as the densities of networked storage systems and remote computing systems increase, various physical limitations can be reached. These limitations include density limitations based on the underlying storage technology, such as in the example of large arrays of rotating magnetic media storage systems. These limitations can also include computing density limitations based on the various physical space requirements for network interconnect as well as the large space requirements for environmental climate control systems.

OVERVIEW

Machine templates are described herein that provide for enhanced configuration and deployment of arrangements of physical computing components coupled over a communication fabric. In one example, a method includes presenting a user interface indicating a plurality of templates each specifying at least a predefined arrangement of physical computing components for inclusion in compute units, and receiving a user selection indicating a selected template among the plurality of templates to form a target compute unit. The method includes allocating to the target compute unit a set of physical computing components according to the selected template, and instructing a management entity to establish the target compute unit based at least on logical partitioning within a communication fabric communicatively coupling the set of physical computing components of the target compute unit.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Discussed herein are various enhanced systems, processes, and platforms for providing hardware configurations among individual physical computing components coupled over a shared communication fabric. These hardware configurations provide several preconfigured or predetermined configurations which allow for faster user deployment of arbitrarily defined machines, referred to herein as compute units, for various data processing and storage tasks. The term machine template is used herein, and other terms can also be applied, such as hardware template or hardware container. Machine templates describe potential compute units and comprise a preconfigured or predetermined configuration among physical hardware elements and software configurations. Machine templates can be used to form specialized and arbitrarily defined computing systems and computing arrangements within a shared communication fabric. Advantageously, users need not have specialized knowledge of which hardware components are needed in order to implement a compute unit or to provide enough processing/storage resources for various target applications. Moreover, various thresholds can be established for the hardware containers or templates which allow for adding or removal of hardware elements from individual compute units according to performance needs, utilization amounts, capacity requirements, and other factors.

Various communication fabric types might be employed herein. For example, a Peripheral Component Interconnect Express (PCIe) fabric can be employed, which might comprise various versions, such as 3.0, 4.0, or 5.0, among others. Instead of a PCIe fabric, other point-to-point communication fabrics or communication buses with associated physical layers, electrical signaling, protocols, and layered communication stacks can be employed, and these might include Gen-Z, Ethernet, InfiniB and, NVMe, Ethernet, Internet Protocol (IP), Serial Attached SCSI (SAS), FibreChannel, Thunderbolt, Serial Attached ATA Express (SATA Express), Cache Coherent Interconnect for Accelerators (CCIX), Compute Express Link (CXL), or Open Coherent Accelerator Processor Interface (OpenCAPI), among others. Parallel, serial, or combined parallel/serial types of interfaces can also apply to the examples herein. Although the examples below employ PCIe as the exemplary fabric type, it should be understood that others can instead be used. PCIe is a high-speed serial computer expansion bus standard, and typically has point-to-point connections among hosts and devices, or among peer devices. A PCIe communication fabric can be established using various switching circuitry and control architectures described herein.

Figure 1:
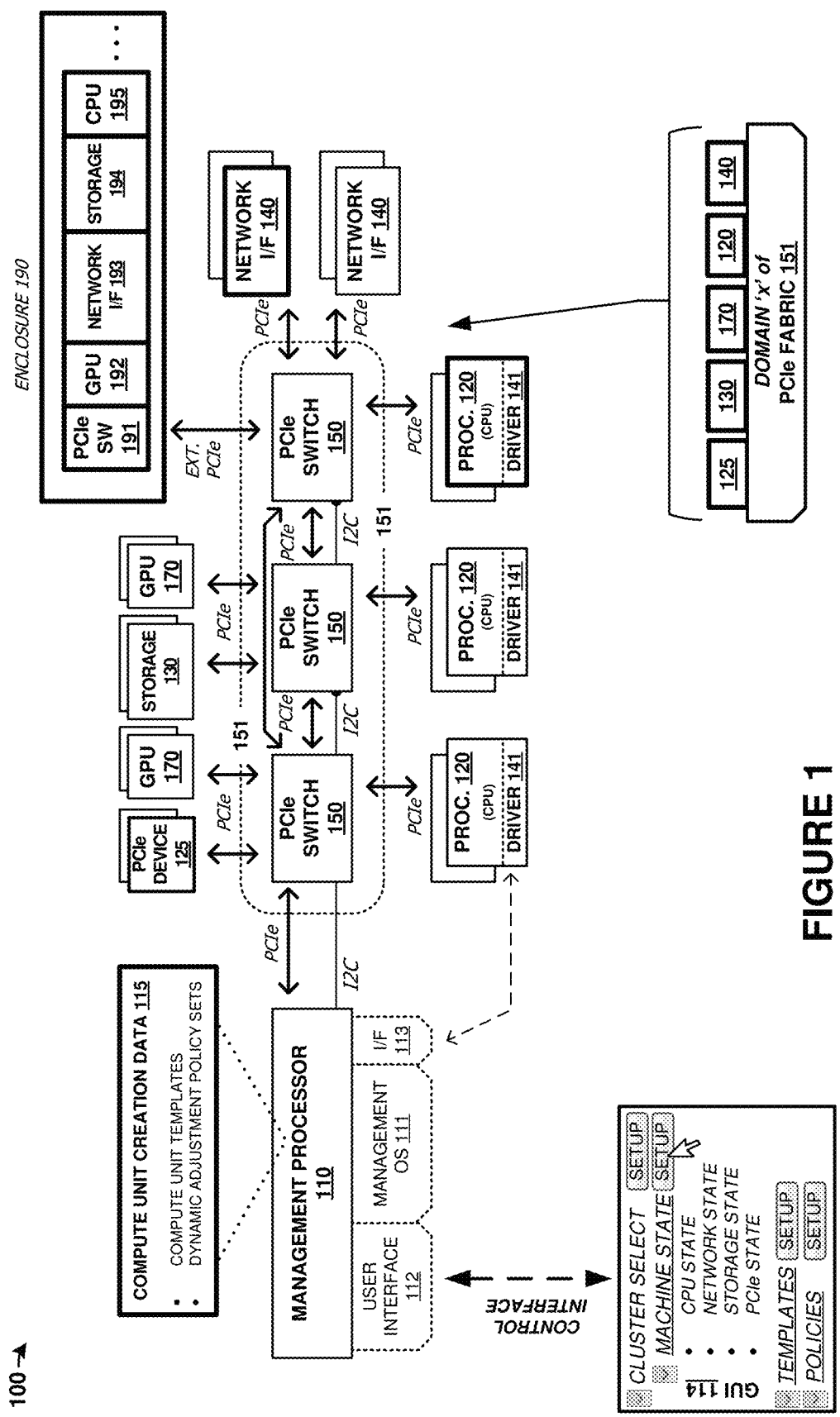
FIG. 1 is a diagram illustrating a computing platform in an implementation.

As a first example context for machine templates, FIG. 1 is presented. FIG. 1 is a system diagram illustrating computing platform 100. Computing platform 100 includes one or more management processors 110, and a plurality of physical computing components. The physical computing components include CPUs of processing modules 120, PCIe devices 125, storage units 130, network modules 140, PCIe switch modules 150, and graphics processing units (GPUs) 170. These physical computing components are communicatively coupled over PCIe fabric 151 formed from PCIe switch elements 150 and various corresponding PCIe links. PCIe fabric 151 configured to communicatively couple a plurality of physical computing components and establish compute units using logical partitioning within the PCIe fabric. These compute units, referred to in FIG. 1 as machine(s) 160, can each be comprised of any number of user-defined quantities of CPUs of processing modules 120, PCIe devices 125, storage units 130, network interfaces 140 modules, and GPUs 170, including zero of any module.

The components of platform 100 can be included in one or more physical enclosures, such as rack-mountable units which can further be included in shelving or rack units. A predetermined number of components of platform 100 can be inserted or installed into a physical enclosure, such as a modular framework where modules can be inserted and removed according to the needs of a particular end user. An enclosed modular system, such as platform 100, can include physical support structure and enclosure that includes circuitry, printed circuit boards, semiconductor systems, and structural elements. The modules that comprise the components of platform 100 are insertable and removable from a rackmount style of enclosure. In some examples, the elements of FIG. 1 are included in a 2U chassis for mounting in a larger rackmount environment. It should be understood that the components of FIG. 1 can be included in any physical mounting environment, and need not include any associated enclosures or rackmount elements.

In addition to the components described above, an external enclosure can be employed that comprises a plurality of graphics modules, network cards, or storage modules, and processing modules, among other elements. In FIG. 1, enclosure 190 (e.g. a just a box of disks (JBOD) enclosure) is shown that includes a PCIe switch circuit 191 that couples any number of included devices, such as GPU modules 192, network interfaces unit modules 193, storage unit modules 194 and processing modules (CPUs) 195, over one or more PCIe links to another enclosure comprising the computing, storage, and network elements discussed above. The enclosure might comprise an enclosure different from a JBOD enclosure, such as a suitable modular assembly where individual modules can be inserted and removed into associated slots or bays. In JBOD examples, disk drives or storage devices are typically inserted to create a storage system. However, in the examples herein, graphics modules are inserted instead of storage drives or storage modules, which advantageously provides for coupling of a large number of GPUs to handle data/graphics processing within a similar physical enclosure space. In one example, the JBOD enclosure might include 24 slots for storage/drive modules that are instead populated with one or more GPUs carried on graphics modules. The external PCIe link that couples enclosures can comprise any of the external PCIe link physical and logical examples discussed herein.

Once the components of platform 100 have been inserted into the enclosure or enclosures, the components can be coupled over the PCIe fabric and logically isolated into any number of separate and arbitrarily defined arrangements called "machines" or compute units. The PCIe fabric can be configured by management processor 110 to selectively route traffic among the components of a particular processor module and with external systems, while maintaining logical isolation between components not included in a particular processor module. In this way, a flexible "bare metal" configuration can be established among the components of platform 100. The individual compute units can be associated with external users or client machines that can utilize the computing, storage, network, or graphics processing resources of the compute units. Moreover, any number of compute units can be grouped into a "cluster" of compute units for greater parallelism and capacity. Although not shown in FIG. 1 for clarity, various power supply modules and associated power and control distribution links can also be included.

In some examples, management processors 110 may provide for creation of compute units via one or more user interfaces. For example, management processors 110 may provide a user interface which may present machine templates for compute units that may specify hardware components to be allocated, as well as software and configuration information, for compute units created using the template. In some examples, a compute unit creation user interface may provide machine templates for compute units based on use cases or categories of usage for compute units. For example, the user interface may provide suggested machine templates or compute unit configurations for game server units, artificial intelligence learning compute units, data analysis units, and storage server units. For example, a game server unit template may specify additional processing resources when compared to a storage server unit template. Additional examples are discussed below. Further, the user interface may provide for customization of the templates or compute unit configurations and options for users to create compute unit templates from component types selected arbitrarily from lists or categories of components.

In some examples, management processors 110 may provide for policy based dynamic adjustments to compute units during operation. In some examples, the compute unit creation user interface can allow the user to define policies for adjustments of the hardware and software allocated to the compute unit as well as adjustments to the configuration information thereof during operation. In an example, during operation, the management processors 110 may analyze telemetry data of the compute unit to determine the utilization of the current resources. Based on the current utilization, a dynamic adjustment policy may specify that processing resources, storage resources, networking resources, and so on be allocated to the compute unit or removed from the compute unit. For example, the telemetry data may show that the current usage level of the allocated storage resources of a storage compute unit is approaching one hundred percent and allocate an additional storage device to the compute unit.

In some examples, management processors 110 may provide for control and management of multiple protocol communication fabrics. For example, management processors 110 and the PCIe switch devices of the PCIe fabric 151 may provide for communicative coupling of physical components using multiple different implementations or versions of PCIe and similar protocols. For example, different PCIe versions might be employed for different physical components in the same PCIe fabric. Further, next-generation interfaces can be employed, such as Gen-Z, CCIX, CXL, or OpenCAPI. Also, although PCIe is used in FIG. 1, it should be understood that PCIe may be absent and different communication links or busses can instead be employed, such as NVMe, Ethernet, SAS, FibreChannel, Thunderbolt, SATA Express, among other interconnect, network, and link interfaces.

In some implementations, enclosures, such as enclosure 190, may be coupled to PCIe fabric 151. PCIe fabric 151 may utilize a primary communication protocol (e.g. PCIe version 3.0) and the enclosures may be coupled to PCIe fabric 151 using the primary communication protocol. Within the enclosures, PCIe switch 191 and physical components 192-195 may be communicatively coupled using a different communication protocol (e.g. Gen-Z or CXL) from the communication protocol. In addition, or alternatively, some of ports of PCIe switches 150 of PCIe fabric 151 may utilize different communication protocols. PCIe switch 191 of enclosure 190 or PCIe switches 150 may provide an interface between the multiple different implementations or versions of PCIe and similar protocols.

In some examples, management processors 110 may control the PCIe fabric 151 to form compute units using particular implementations or versions of PCIe and similar protocols. In some such examples, when creating a compute unit, management processors 110 may prevent or avoid allocating physical components that utilize the primary communication protocol with physical components from enclosures such as 190 utilizing different communication protocols. In addition, or alternatively, some examples may include forming compute units that utilize multiple protocols and which may include physical components selected from among components 120, 125, 130, 140, and 170 as well as components in enclosures such as components 192-195.

Examples are not limited to any of the above example functions and some examples may include combinations of such functionality. For example, in some implementations, the physical components of a disaggregated computing architecture may utilize multiple communication protocols and management processors may provide templates for compute units as well as dynamic adjustments based on telemetry data. In a particular example, the physical components of the disaggregated computing architecture may include a mix of physical components that utilize either PCIe version 3.0 or another communication protocol. In the compute unit creation user interface, the user may choose to form a compute unit using a template for a game server including physical components utilizing PCIe version 3.0 and select policies for dynamic adjustment to allocate additional processing components to the compute unit if the utilization exceeds a first threshold and to migrate the compute unit to physical components utilizing the other communication protocol if the utilization exceeds a second threshold. Similarly, the opposite adjustments may be performed if utilization falls below the respective thresholds.

Turning now to the components of platform 100, management processor 110 can comprise one or more microprocessors and other processing circuitry that retrieves and executes software, such as user interface 112 and management operating system 111, from an associated storage system. Processor 110 can be implemented within a single processing device but can also be distributed across multiple processing devices or sub-systems that cooperate in executing program instructions. Examples of processor 110 include general purpose central processing units, application specific processors, and logic devices, as well as any other type of processing device, combinations, or variations thereof. In some examples, processor 110 comprises an Intel® or AMD® microprocessor, ARM® microprocessor, field-programmable gate array (FPGA), application specific integrated circuit (ASIC), application specific processor, or other microprocessor or processing elements.

In FIG. 1, processor 110 provides interface 113. Interface 113 comprises a communication link between processor 110 and any component coupled to PCIe fabric 151, which may comprise a PCIe link. In some examples, this interface may employ Ethernet traffic transported over a PCIe link. Additionally, each processing module 120 in FIG. 1 is configured with driver 141 which may provide for Ethernet communication over PCIe links. Thus, any of processing module 120 and management processor 110 can communicate over Ethernet that is transported over the PCIe fabric. However, implementations are not limited to Ethernet over PCIe and other communication interfaces may be used, including standard PCIe traffic over PCIe interfaces.

A plurality of processing modules 120 are included in platform 100. Each processing module 120 includes one or more CPUs or microprocessors and other processing circuitry that retrieves and executes software, such as driver 141 and any number of end user applications, from an associated storage system. Each processing module 120 can be implemented within a single processing device but can also be distributed across multiple processing devices or sub-systems that cooperate in executing program instructions. Examples of each processing module 120 include general purpose central processing units, application specific processors, and logic devices, as well as any other type of processing device, combinations, or variations thereof. In some examples, each processing module 120 comprises an Intel® or AMD® microprocessor, ARM® microprocessor, graphics processor, compute cores, graphics cores, ASIC, FPGA, or other microprocessor or processing elements. Each processing module 120 can also communicate with other compute units, such as those in a same storage assembly/enclosure or another storage assembly/enclosure over one or more PCIe interfaces and PCIe fabric 151.

PCIe devices 125 comprise one or more instances of specialized circuitry, ASIC circuitry, or FPGA circuitry, among other circuitry. PCIe devices 125 each include a PCIe interface comprising one or more PCIe lanes. These PCIe interfaces can be employed to communicate over PCIe fabric 151. PCIe devices 125 can include processing components, memory components, storage components, interfacing components, among other components. PCIe devices 125 might comprise PCIe endpoint devices or PCIe host devices which may or may not have a root complex.

When PCIe devices 125 comprise FPGA devices, example implementations can include Xilinx® Alveo™ (U200/U250/U280) devices, or other FPGA devices which include PCIe interfaces. FPGA devices, when employed in PCIe devices 125, can receive processing tasks from another PCIe device, such as a CPU or GPU, to offload those processing tasks into the FPGA programmable logic circuitry. An FPGA is typically initialized into a programmed state using configuration data, and this programmed state includes various logic arrangements, memory circuitry, registers, processing cores, specialized circuitry, and other features which provide for specialized or application-specific circuitry. FPGA devices can be re-programmed to change the circuitry implemented therein, as well as to perform a different set of processing tasks at different points in time. FPGA devices can be employed to perform machine learning tasks, implement artificial neural network circuitry, implement custom interfacing or glue logic, perform encryption/decryption tasks, perform block chain calculations and processing tasks, or other tasks. In some examples, a CPU will provide data to be processed by the FPGA over a PCIe interface to the FPGA. The FPGA can process this data to produce a result and provide this result over the PCIe interface to the CPU. More than one CPU and/or FPGA might be involved to parallelize tasks over more than one device or to serially process data through more than one device.

The management processor 110 may include a compute unit creation data storage 115, among other configuration data. In some examples, the compute unit creation data storage 115 may include compute unit templates and dynamic adjustment policy sets, among other creation data. As discussed above, the compute unit templates and dynamic adjustment policy sets may be provided via a user interface for selection to a user during compute unit creation. In such examples, the user may select the presented compute unit templates and dynamic adjustment policy sets as is, or the user may select and customize presented compute unit templates and dynamic adjustment policy sets.

In some examples, PCIe devices 125 include locally-stored configuration data which may be supplemented, replaced, or overridden using configuration data stored in the configuration data storage. This configuration data can comprise firmware, programmable logic programs, bitstreams, or objects, PCIe device initial configuration data, among other configuration data discussed herein. When PCIe devices 125 include FPGA devices, such as FPGA chips, circuitry, and logic, PCIe devices 125 might also include static random-access memory (SRAM) devices, programmable read-only memory (PROM) devices used to perform boot programming, power-on configuration, or other functions to establish an initial configuration for the FPGA device. In some examples, the SRAM or PROM devices can be incorporated into FPGA circuitry.

A plurality of storage units 130 are included in platform 100. Each storage unit 130 includes one or more storage drives, such as solid-state drives in some examples. Each storage unit 130 also includes PCIe interfaces, control processors, and power system elements. Each storage unit 130 also includes an on-sled processor or control system for traffic statistics and status monitoring, among other operations. Each storage unit 130 comprises one or more solid-state memory devices with a PCIe interface. In yet other examples, each storage unit 130 comprises one or more separate solid-state drives (SSDs) or magnetic hard disk drives (HDDs) along with associated enclosures and circuitry.

A plurality of graphics processing units (GPUs) 170 are included in platform 100. Each GPU comprises a graphics processing resource that can be allocated to one or more compute units. The GPUs can comprise graphics processors, shaders, pixel render elements, frame buffers, texture mappers, graphics cores, graphics pipelines, graphics memory, or other graphics processing and handling elements. In some examples, each GPU 170 comprises a graphics 'card' comprising circuitry that supports a GPU chip. Example GPU cards include nVIDIA® Jetson cards that include graphics processing elements and compute elements, along with various support circuitry, connectors, and other elements. In further examples, other style of graphics processing units or graphics processing assemblies can be employed, such as machine learning processing units, tensor processing units (TPUs), or other specialized processors that may include similar elements as GPUs but lack rendering components to focus processing and memory resources on processing of data.

Network interfaces 140 include network interface cards for communicating over TCP/IP (Transmission Control Protocol (TCP)/Internet Protocol) networks or for carrying user traffic, such as iSCSI (Internet Small Computer System Interface) or NVMe (NVM Express) traffic for storage units 130 or other TCP/IP traffic for processing modules 120. Network interfaces 140 can comprise Ethernet interface equipment, and can communicate over wired, optical, or wireless links. External access to components of platform 100 is provided over packet network links provided by network interfaces 140. Network interfaces 140 communicate with other components of platform 100, such as processing modules 120, PCIe devices 125, and storage units 130 over associated PCIe links and PCIe fabric 151. In some examples, network interfaces are provided for intra-system network communication among for communicating over Ethernet networks for exchanging communications between any of processing modules 120 and management processors 110.

Each PCIe switch 150 communicates over associated PCIe links. In the example in FIG. 1, PCIe switches 150 can be used for carrying user data between PCIe devices 125, network interfaces 140, storage modules 130, and processing modules 120. Each PCIe switch 150 comprises a PCIe cross connect switch for establishing switched connections between any PCIe interfaces handled by each PCIe switch 150. In some examples, each PCIe switch 150 comprises a PLX Technology PEX8725 10-port, 24 lane PCIe switch chip. In other examples, each PCIe switch 150 comprises a PLX Technology PEX8796 24-port, 96 lane PCIe switch chip.

The PCIe switches discussed herein can comprise PCIe crosspoint switches, which logically interconnect various ones of the associated PCIe links based at least on the traffic carried by each PCIe link. In these examples, a domain-based PCIe signaling distribution can be included which allows segregation of PCIe ports of a PCIe switch according to user-defined groups. The user-defined groups can be managed by processor 110 which logically integrate components into associated compute units 160 of a particular cluster and logically isolate components and compute units among different clusters. In addition to, or alternatively from the domain-based segregation, each PCIe switch port can be a non-transparent (NT) or transparent port. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port.

Advantageously, this NT port-based segregation or domain-based segregation can allow physical components (i.e. CPU, GPU, storage, network) only to have visibility to those components that are included via the segregation/partitioning. Thus, groupings among a plurality of physical components can be achieved using logical partitioning among the PCIe fabric. This partitioning is scalable in nature, and can be dynamically altered as-needed by a management processor or other control elements. The management processor can control PCIe switch circuitry that comprises the PCIe fabric to alter the logical partitioning or segregation among PCIe ports and thus alter composition of groupings of the physical components. These groupings, referred herein as compute units, can individually form "machines" and can be further grouped into clusters of many compute units/machines. Physical components, such as storage drives, processors, or network interfaces, can be added to or removed from compute units according to user instructions received over a user interface, dynamically in response to loading/idle conditions, or preemptively due to anticipated need, among other considerations discussed herein.

As used herein, unless specified otherwise, domain and partition are intended to be interchangeable and may include similar schemes referred to by one of skill in the art as either domain and partition in PCIe and similar network technology. Further, as used herein, unless specified otherwise, segregating and partitioning are intended to be interchangeable and may include similar schemes referred to by one of skill in the art as either segregating and partitioning in PCIe and similar network technology.

PCIe can support multiple bus widths, such as x1, x2, x4, x8, x16, and x32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling. PCIe also might have different implementations or versions employed herein. For example, PCIe version 3.0 or later might be employed. Moreover, next-generation interfaces can be employed, such as Gen-Z, Cache Coherent CCIX, CXL, or OpenCAPI. Also, although PCIe is used in FIG. 1, it should be understood that different communication links or busses can instead be employed, such as NVMe, Ethernet, SAS, FibreChannel, Thunderbolt, SATA Express, among other interconnect, network, and link interfaces. NVMe is an interface standard for mass storage devices, such as hard disk drives and solid-state memory devices. NVMe can supplant SATA interfaces for interfacing with mass storage devices in personal computers and server environments. However, these NVMe interfaces are limited to one-to-one host-drive relationship, similar to SATA devices. In the examples discussed herein, a PCIe interface can be employed to transport NVMe traffic and present a multi-drive system comprising many storage drives as one or more NVMe virtual logical unit numbers (VLUNs) over a PCIe interface.

Any of the links in FIG. 1 can each use various communication media, such as air, space, metal, optical fiber, or some other signal propagation path, including combinations thereof. Any of the links in FIG. 1 can include any number of PCIe links or lane configurations. Any of the links in FIG. 1 can each be a direct link or might include various equipment, intermediate components, systems, and networks. Any of the links in FIG. 1 can each be a common link, shared link, aggregated link, or may be comprised of discrete, separate links.

In FIG. 1, any processing module 120 has configurable logical visibility to any/all storage units 130, GPU 170, PCIe devices 125, or other physical components of platform 100, as segregated logically by the PCIe fabric. Any processing module 120 can transfer data for storage on any storage unit 130 and retrieve data stored on any storage unit 130. Thus, 'm' number of storage drives can be coupled with 'n' number of processors to allow for a large, scalable architecture with a high-level of redundancy and density. Furthermore, any processing module 120 can transfer data for processing by any GPU 170 or PCIe devices 125, or hand off control of any GPU or FPGA to another processing module 120.

To provide visibility of each processing module 120 to any PCIe device 125, storage unit 130, or GPU 170, various techniques can be employed. In a first example, management processor 110 establishes a cluster that includes one or more compute units 160. These compute units comprise one or more processing modules 120, zero or more PCIe devices 125, zero or more storage units 130, zero or more network interface units 140, and zero or more graphics processing units 170. Elements of these compute units are communicatively coupled by portions of PCIe fabric 151. Once compute units 160 have been assigned to a particular cluster, further resources can be assigned to that cluster, such as storage resources, graphics processing resources, and network interface resources, among other resources. Management processor 110 can instantiate/bind a subset number of the total quantity of storage resources of platform 100 to a particular cluster and for use by one or more compute units 160 of that cluster. For example, 16 storage drives spanning four storage units might be assigned to a group of two compute units 160 in a cluster. The compute units 160 assigned to a cluster then handle transactions for that subset of storage units, such as read and write transactions.

Each compute unit 160, specifically each processor of the compute unit, can have memory-mapped or routing-table based visibility to the storage units or graphics units within that cluster, while other units not associated with a cluster are generally not accessible to the compute units until logical visibility is granted. Moreover, each compute unit might only manage a subset of the storage or graphics units for an associated cluster. Storage operations or graphics processing operations might, however, be received over a network interface associated with a first compute unit that are managed by a second compute unit. When a storage operation or graphics processing operation is desired for a resource unit not managed by a first compute unit (i.e. managed by the second compute unit), the first compute unit uses the memory mapped access or routing-table based visibility to direct the operation to the proper resource unit for that transaction, by way of the second compute unit. The transaction can be transferred and transitioned to the appropriate compute unit that manages that resource unit associated with the data of the transaction. For storage operations, the PCIe fabric is used to transfer data between compute units/processors of a cluster so that a particular compute unit/processor can store the data in the storage unit or storage drive that is managed by that particular compute unit/processor, even though the data might be received over a network interface associated with a different compute unit/processor. For graphics processing operations, the PCIe fabric is used to transfer graphics data and graphics processing commands between compute units/processors of a cluster so that a particular compute unit/processor can control the GPU or GPUs that are managed by that particular compute unit/processor, even though the data might be received over a network interface associated with a different compute unit/processor. Thus, while each particular compute unit of a cluster actually manages a subset of the total resource units (such as storage drives in storage units or graphics processors in graphics units), all compute units of a cluster have visibility to, and can initiate transactions to, any of resource units of the cluster. A managing compute unit that manages a particular resource unit can receive re-transferred transactions and any associated data from an initiating compute unit by at least using a memory-mapped address space or routing table to establish which processing module handles storage operations for a particular set of storage units.

In graphics processing examples, NT partitioning or domain-based partitioning in the switched PCIe fabric can be provided by one or more of the PCIe switches with NT ports or domain-based features. This partitioning can ensure that GPUs can be interworked with a desired compute unit and that more than one GPU, such as more than eight (8) GPUs can be associated with a particular compute unit. Moreover, dynamic GPU-compute unit relationships can be adjusted on-the-fly using partitioning across the PCIe fabric. Shared network resources can also be applied across compute units for graphics processing elements. For example, when a first compute processor determines that the first compute processor does not physically manage the graphics unit associated with a received graphics operation, then the first compute processor transfers the graphics operation over the PCIe fabric to another compute processor of the cluster that does manage the graphics unit.

In further examples, memory mapped direct memory access (DMA) conduits can be formed between individual CPU/PCIe device pairs. This memory mapping can occur over the PCIe fabric address space, among other configurations. To provide these DMA conduits over a shared PCIe fabric comprising many CPUs and GPUs, the logical partitioning described herein can be employed. Specifically, NT ports or domain-based partitioning on PCIe switches can isolate individual DMA conduits among the associated CPUs/GPUs.

In FPGA-based processing examples, NT partitioning or domain-based partitioning in the switched PCIe fabric can be provided by one or more of the PCIe switches with NT ports or domain-based features. This partitioning can ensure that PCIe devices comprising FPGA devices can be interworked with a desired compute unit and that more than one FPGA can be associated with a particular compute unit. Moreover, dynamic FPGA-compute unit relationships can be adjusted on-the-fly using partitioning across the PCIe fabric. Shared network resources can also be applied across compute units for FPGA processing elements. For example, when a first compute processor determines that the first compute processor does not physically manage the FPGA associated with a received FPGA operation, then the first compute processor transfers the FPGA operation over the PCIe fabric to another compute processor of the cluster that does manage the FPGA. In further examples, memory mapped DMA conduits can be formed between individual CPU/FPGA pairs. This memory mapping can occur over the PCIe fabric address space, among other configurations. To provide these DMA conduits over a shared PCIe fabric comprising many CPUs and FPGAs, the logical partitioning described herein can be employed. Specifically, NT ports or domain-based partitioning on PCIe switches can isolate individual DMA conduits among the associated CPUs/FPGAs.

In storage operations, such as a write operation, data can be received over network interfaces 140 of a particular cluster by a particular processor of that cluster. Load balancing or other factors can allow any network interface of that cluster to receive storage operations for any of the processors of that cluster and for any of the storage units of that cluster. For example, the write operation can be a write operation received over a first network interface 140 of a first cluster from an end user employing an iSCSI protocol or NVMe protocol. A first processor of the cluster can receive the write operation and determine if the first processor manages the storage drive or drives associated with the write operation, and if the first processor does, then the first processor transfers the data for storage on the associated storage drives of a storage unit over the PCIe fabric. The individual PCIe switches 150 of the PCIe fabric can be configured to route PCIe traffic associated with the cluster among the various storage, processor, and network elements of the cluster, such as using domain-based routing or NT ports. If the first processor determines that the first processor does not physically manage the storage drive or drives associated with the write operation, then the first processor transfers the write operation to another processor of the cluster that does manage the storage drive or drives over the PCIe fabric. Data striping can be employed by any processor to stripe data for a particular write transaction over any number of storage drives or storage units, such as over one or more of the storage units of the cluster.

In this example, PCIe fabric 151 associated with platform 100 has 64-bit address spaces, which allows an addressable space of 264 bytes, leading to at least 16 exbibytes of byte-addressable memory. The 64-bit PCIe address space can be shared by all compute units or segregated among various compute units forming clusters for appropriate memory mapping to resource units. Individual PCIe switches 150 of the PCIe fabric can be configured to segregate and route PCIe traffic associated with particular clusters among the various storage, compute, graphics processing, and network elements of the cluster. This segregation and routing can be establishing using domain-based routing or NT ports to establish cross-point connections among the various PCIe switches of the PCIe fabric. Redundancy and failover pathways can also be established so that traffic of the cluster can still be routed among the elements of the cluster when one or more of the PCIe switches fails or becomes unresponsive. In some examples, a mesh configuration is formed by the PCIe switches of the PCIe fabric to ensure redundant routing of PCIe traffic.

Management processor 110 controls the operations of PCIe switches 150 and PCIe fabric 151 over one or more interfaces, which can include inter-integrated circuit (I2C) interfaces that communicatively couple each PCIe switch of the PCIe fabric. Management processor 110 can establish NT-based or domain-based segregation among a PCIe address space using PCIe switches 150. Each PCIe switch can be configured to segregate portions of the PCIe address space to establish cluster-specific partitioning. Various configuration settings of each PCIe switch can be altered by management processor 110 to establish the domains and cluster segregation. In some examples, management processor 110 can include a PCIe interface and communicate/configure the PCIe switches over the PCIe interface or sideband interfaces transported within the PCIe protocol signaling.

Management operating system (OS) 111 is executed by management processor 110 and provides for management of resources of platform 100. The management includes creation, alteration, and monitoring of one or more clusters comprising one or more compute units. Management OS 111 provides for the functionality and operations described herein for management processor 110.

Management processor 110 also includes user interface 112, which can present graphical user interface (GUI) 114 to one or more users. User interface 112 and GUI 114 can be employed by end users or administrators to establish clusters, assign assets (compute units/machines) to each cluster. In FIG. 1, GUI 114 allows end users to create and administer clusters as well as assign one or more machine/compute units to the clusters. In some examples, GUI 114 or other portions of user interface 112 provides an interface to allow an end user to determine one or more compute unit templates and dynamic adjustment policy sets to use or customize for use in creation of compute units. GUI 114 can be employed to manage, select, and alter machine templates. GUI 114 can be employed to manage, select, and alter policies for compute units. GUI 114 also can provide telemetry information for the operation of system 100 to end users, such as in one or more status interfaces or status views. The state of various components or elements of system 100 can be monitored through GUI 114, such as processor/CPU state, network state, storage unit state, PCIe element state, among others. Various performance metrics, error statuses can be monitored using GUI 114 or user interface 112. User interface 112 can provide other user interfaces than GUI 114, such as command line interfaces (CLIs), application programming interfaces (APIs), or other interfaces. In some examples, GUI 114 is provided over a websockets-based interface.

One or more management processors can be included in a system, such as when each management processor can manage resources for a predetermined number of clusters or compute units. User commands, such as those received over a GUI, can be received into any of the management processors of a system and forwarded by the receiving management processor to the handling management processor. Each management processor can have a unique or pre-assigned identifier which can aid in delivery of user commands to the proper management processor. Additionally, management processors can communicate with each other, such as using a mailbox process or other data exchange technique. This communication can occur over dedicated sideband interfaces, such as I2C interfaces, or can occur over PCIe or Ethernet interfaces that couple each management processor.

Management OS 111 also includes emulated network interface 113. Emulated network interface 113 comprises a transport mechanism for transporting network traffic over one or more PCIe interfaces. Emulated network interface 113 can emulate a network device, such as an Ethernet device, to management processor 110 so that management processor 110 can interact/interface with any of processing modules 120 over a PCIe interface as if the processor was communicating over a network interface. Emulated network interface 113 can comprise a kernel-level element or module which allows management OS 111 to interface using Ethernet-style commands and drivers. Emulated network interface 113 allows applications or OS-level processes to communicate with the emulated network device without having associated latency and processing overhead associated with a network stack. Emulated network interface 113 comprises a software component, such as a driver, module, kernel-level module, or other software component that appears as a network device to the application-level and system-level software executed by the processor device.

In the examples herein, network interface 113 advantageously does not require network stack processing to transfer communications. Instead, emulated network interface 113 transfers communications as associated traffic over a PCIe interface or PCIe fabric to another emulated network device. Emulated network interface 113 does not employ network stack processing yet still appears as network device to the operating system of an associated processor, so that user software or operating system elements of the associated processor can interact with network interface 113 and communicate over a PCIe fabric using existing network-facing communication methods, such as Ethernet communications.

Emulated network interface 113 translates PCIe traffic into network device traffic and vice versa. Processing communications transferred to the network device over a network stack is omitted, where the network stack would typically be employed for the type of network device/interface presented. For example, the network device might be presented as an Ethernet device to the operating system or applications. Communications received from the operating system or applications are to be transferred by the network device to one or more destinations. However, emulated network interface 113 does not include a network stack to process the communications down from an application layer down to a link layer. Instead, emulated network interface 113 extracts the payload data and destination from the communications received from the operating system or applications and translates the payload data and destination into PCIe traffic, such as by encapsulating the payload data into PCIe frames using addressing associated with the destination.

Management driver 141 is included on each processing module 120. Management driver 141 can include emulated network interfaces, such as discussed for emulated network interface 113. Additionally, management driver 141 monitors operation of the associated processing module 120 and software executed by a CPU of processing module 120 and provides telemetry for this operation to management processor 110. Thus, any user provided software can be executed by CPUs of processing modules 120, such as user-provided operating systems (Windows, Linux, MacOS, Android, iOS, etc. . . . ) or user application software and drivers. Management driver 141 provides functionality to allow each processing module 120 to participate in the associated compute unit and/or cluster, as well as provide telemetry data to an associated management processor. In examples in which compute units include physical components that utilize multiple or different communications protocols, management driver 141 may provide functionality to enable inter-protocol communication to occur within the compute unit. Each processing module 120 can also communicate with each other over an emulated network device that transports the network traffic over the PCIe fabric. Driver 141 also provides an API for user software and operating systems to interact with driver 141 as well as exchange control/telemetry signaling with management processor 110.

Figure 2:
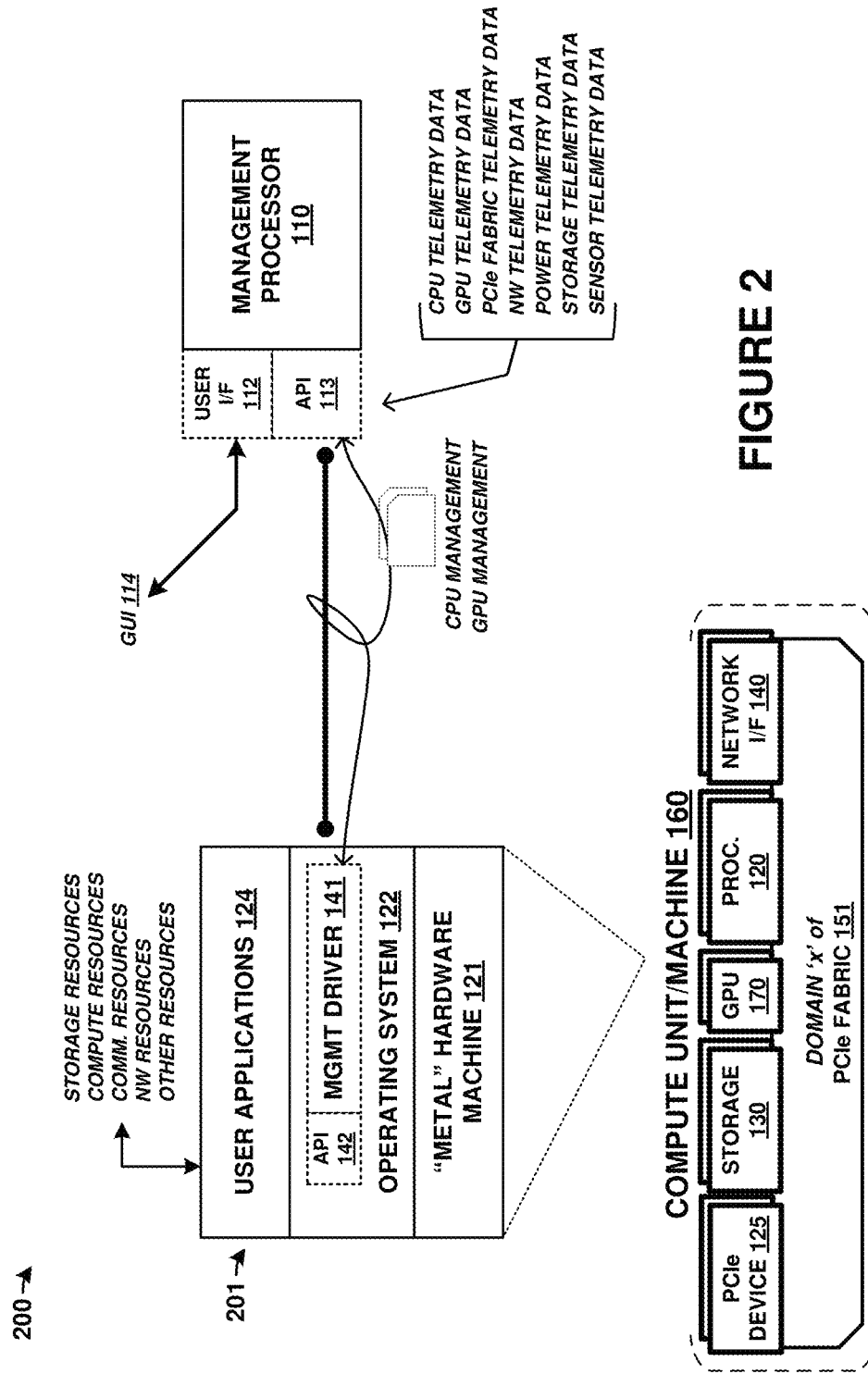
FIG. 2 is a diagram illustrating management of a computing platform in an implementation.

FIG. 2 is a system diagram that includes further details on elements from FIG. 1. System 200 includes a detailed view of an implementation of processing module 120 as well as management processor 110. In FIG. 2, processing module 120 can be an exemplary processor in any compute unit or machine of a cluster. Detailed view 201 shows several layers of processing module 120. A first layer 121 is the hardware layer or "metal" machine infrastructure of processor processing module 120. A second layer 122 provides the OS as well as management driver 141 and API 142. Finally, a third layer 124 provides user-level applications. View 201 shows that user applications can access storage, processing (CPU, GPU, or FPGA), and communication resources of the cluster, such as when the user application comprises a clustered storage system or a clustered processing system.

As discussed above, management driver 141 provides an emulated network device for communicating over a PCIe fabric with management processor 110 (or other processor elements). This may be performed as Ethernet traffic transported over PCIe. In such a case, a network stack is not employed in driver 141 to transport the traffic over PCIe. Instead, driver 141 may appear as a network device to an operating system or kernel to each processing module 120. User-level services/applications/software can interact with the emulated network device without modifications from a normal or physical network device. However, the traffic associated with the emulated network device is transported over a PCIe link or PCIe fabric, as shown. API 113 can provide a standardized interface for the management traffic, such as for control instructions, control responses, telemetry data, status information, or other data.

In addition, management driver 141 may operate as an interface to device drivers of PCIe devices of the compute unit to facilitate an inter-protocol or peer-to-peer communication between device drivers of the PCIe devices of the compute unit, for example, when the PCIe devices utilize different communication protocols. In addition, management drivers 141 may operate to facilitate continued operation during dynamic adjustments to the compute unit based on dynamics adjustment policies. Further, management drivers 141 may operate to facilitate migration to alternative hardware in computing platforms based on a policy (e.g. migration from PCIe version 3.0 hardware to Gen-Z hardware based on utilization or responsiveness policies).

Control elements within corresponding PCIe switch circuitry may be configured to monitor for PCIe communications between compute units utilizing different versions or communication protocols. As discussed above, different versions or communication protocols may be utilized within the computing platform and, in some implementations, within compute units. In some examples, one or more PCIe switches or other devices within the PCIe fabric may operate to act as interfaces between PCIe devices utilizing the different versions or communication protocols. Data transfers detected may be "trapped" and translated or converted to the version or communication protocol utilized by the destination PCIe device by the PCIe switch circuitry and then routed to the destination PCIe device.

Figure 3:
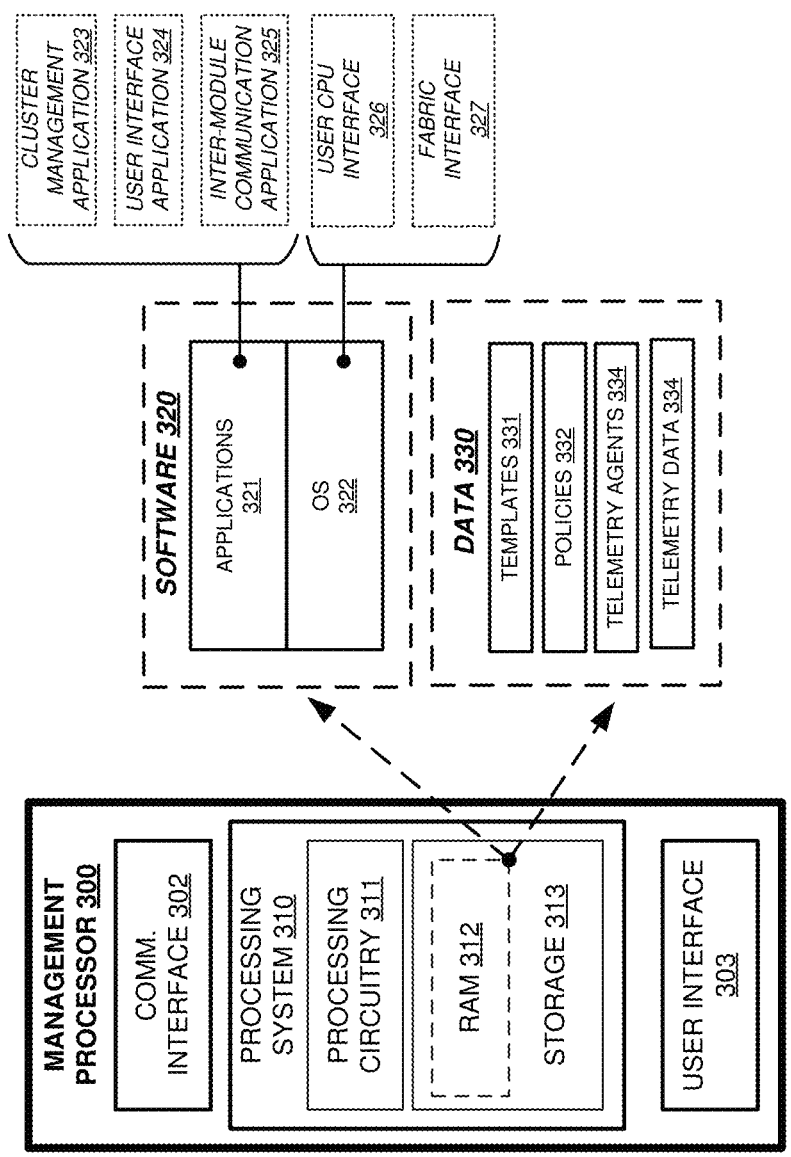
FIG. 3 is a block diagram illustrating a management processor in an implementation.

FIG. 3 is a block diagram illustrating management processor 300. Management processor 300 illustrates an example of any of the management processors discussed herein, such as processor 110 of FIG. 1. Management processor 300 includes communication interface 302, user interface 303, and processing system 310. Processing system 310 includes processing circuitry 311, random access memory (RAM) 312, and storage system 313, although further elements can be included.

Processing circuitry 311 can be implemented within a single processing device but can also be distributed across multiple processing devices or sub-systems that cooperate in executing program instructions. Examples of processing circuitry 311 include general purpose central processing units, microprocessors, application specific processors, and logic devices, as well as any other type of processing device. In some examples, processing circuitry 311 includes physically distributed processing devices, such as cloud computing systems.

Communication interface 302 includes one or more communication and network interfaces for communicating over communication links, networks, such as packet networks, the Internet, and the like. The communication interfaces can include PCIe interfaces, Ethernet interfaces, serial interfaces, serial peripheral interface (SPI) links, inter-integrated circuit (I2C) interfaces, universal serial bus (USB) interfaces, UART interfaces, wireless interfaces, or one or more local or wide area network communication interfaces which can communicate over Ethernet or Internet protocol (IP) links. Communication interface 302 can include network interfaces configured to communicate using one or more network addresses, which can be associated with different network links. Examples of communication interface 302 include network interface card equipment, transceivers, modems, and other communication circuitry.

User interface 303 may include a touchscreen, keyboard, mouse, voice input device, audio input device, or other touch input device for receiving input from a user. Output devices such as a display, speakers, web interfaces, terminal interfaces, and other types of output devices may also be included in user interface 303. User interface 303 can provide output and receive input over a network interface, such as communication interface 302. In network examples, user interface 303 might packetize display or graphics data for remote display by a display system or computing system coupled over one or more network interfaces. Physical or logical elements of user interface 303 can provide alerts or visual outputs to users or other operators. User interface 303 may also include associated user interface software executable by processing system 310 in support of the various user input and output devices discussed above. Separately or in conjunction with each other and other hardware and software elements, the user interface software and user interface devices may support a graphical user interface, a natural user interface, or any other type of user interface.

Storage system 313 and RAM 312 together can comprise a non-transitory data storage system, although variations are possible. Storage system 313 and RAM 312 can each comprise any storage media readable by processing circuitry 311 and capable of storing software and OS images. RAM 312 can include volatile and nonvolatile, removable and non-removable media implemented in any method or technology for storage of information, such as computer readable instructions, data structures, program modules, or other data. Storage system 313 can include non-volatile storage media, such as solid-state storage media, flash memory, phase change memory, or magnetic memory, including combinations thereof. Storage system 313 and RAM 312 can each be implemented as a single storage device but can also be implemented across multiple storage devices or sub-systems. Storage system 313 and RAM 312 can each comprise additional elements, such as controllers, capable of communicating with processing circuitry 311.

Software or data stored on or in storage system 313 or RAM 312 can comprise computer program instructions, firmware, or some other form of machine-readable processing instructions having processes that when executed a processing system direct processor 300 to operate as described herein. For example, software 320 can drive processor 300 to receive user commands to establish clusters comprising compute units among a plurality of physical computing components that include processing modules, storage modules, and network modules. Software 320 can drive processor 300 to receive and monitor telemetry data, statistical information, operational data, and other data to provide telemetry to users and alter operation of clusters according to the telemetry data, policies, or other data and criteria. Software 320 can drive processor 300 to manage cluster and compute/graphics unit resources, establish domain partitioning or NT partitioning among PCIe fabric elements, and interface with individual PCIe switches, among other operations. The software can also include user software applications, application programming interfaces (APIs), or user interfaces. The software can be implemented as a single application or as multiple applications. In general, the software can, when loaded into a processing system and executed, transform the processing system from a general-purpose device into a special-purpose device customized as described herein.

System software 320 illustrates a detailed view of an example configuration of RAM 312. It should be understood that different configurations are possible. System software 320 includes applications 321 and operating system (OS) 322. Software applications 323-326 each comprise executable instructions which can be executed by processor 300 for operating a cluster controller or other circuitry according to the operations discussed herein.

Specifically, cluster management application 323 establishes and maintains clusters and compute units among various hardware elements of a computing platform, such as seen in FIG. 1. User interface application 324 provides one or more graphical or other user interfaces for end users to administer associated clusters and compute units and monitor operations of the clusters and compute units. Inter-module communication application 325 provides communication among other processor 300 elements, such as over I2C, Ethernet, emulated network devices, or PCIe interfaces. User CPU interface 326 provides communication, APIs, and emulated network devices for communicating with processors of compute units, and specialized driver elements thereof. Fabric interface 327 establishes various logical partitioning or domains among communication fabric circuit elements, such as PCIe switch elements of a PCIe fabric. Fabric interface 327 also controls operation of fabric switch elements, and receives telemetry from fabric switch elements. Fabric interface 327 also establishes address traps or address redirection functions within a communication fabric. Fabric interface 327 can interface with one or more fabric switch circuitry elements to establish address ranges which are monitored and redirected, thus forming address traps in the communication fabric.

In an example including multiple communication protocols within the computing platform, a compute unit created using a data analytics template may include a CPU (e.g. processing module 120) attached to the PCIe fabric (e.g. PCIe fabric 151) via a corresponding PCIe version and one or more GPU modules and storage modules within an enclosure utilizing a different PCI version, among other protocols, interfaces, and revisions thereof. One or more of the PCIe switches may provide for peer-to-peer functionality between the GPU modules and storage modules of the enclosure over differing versions of PCIe or differing protocols (e.g. PCIe to Gen-Z), as well as providing an interface between the CPU and the GPU modules and storage modules. The CPU may coordinate data retrieval and analysis between the GPU modules and storage modules using the a first PCIe version communication protocol while a second PCIe version or communication protocol may be used to perform the data retrieval and analysis. Further, the management processor may monitor telemetry data from the compute unit and, in accordance with dynamic adjustment policies, allocate additional or deallocate excess GPU modules and storage modules of the enclosure to the compute unit.

In addition to software 320, other data 330 can be stored by storage system 313 and RAM 312. Data 330 can comprise templates 331, machine policies 332, telemetry agents 333, and telemetry data 334 to be applied against triggers in policies 332. Templates 331 includes specifications or descriptions of various hardware templates or machine templates that have been previously defined. Templates 331 can also include lists or data structures of components which can be employed in template creation or template adjustment. Machine policies 332 includes specifications or descriptions of various machine policies that have been previously defined. These machine policies specifications can include lists of criteria, triggers, thresholds, limits, or other information, as well as indications of the components which are affected by policies. Machine policies 332 can also include lists or data structures of policy factors, criteria, triggers, thresholds, limits, or other information which can be employed in policy creation or policy adjustment. Telemetry agents 333 can include software elements which can be deployed to components in compute units for monitoring the operations of compute units. Telemetry agents 333 can include hardware/software parameters, telemetry device addressing, or other information used for interfacing with monitoring elements, such as IPMI-compliant hardware/software of compute units and communication fabrics. Telemetry data 334 comprises a data store of received data from telemetry elements of various compute units, where this received data can include telemetry data or monitored data. Telemetry data 334 can organize the data into compute unit arrangements, communication fabric arrangements or other structures. Telemetry data 334 might be cached as data 330 and subsequently transferred to other elements of a computing system or for use in presentation via user interfaces.

Software 320 can reside in RAM 312 during execution and operation of processor 300, and can reside in non-volatile portions of storage system 313 during a powered-off state, among other locations and states. Software 320 can be loaded into RAM 312 during a startup or boot procedure as described for computer operating systems and applications. Software 320 can receive user input through user interface 303. This user input can include user commands, as well as other input, including combinations thereof.

Storage system 313 can comprise flash memory such as NAND flash or NOR flash memory, phase change memory, magnetic memory, among other solid-state storage technologies. As shown in FIG. 3, storage system 313 includes software 320. As described above, software 320 can be in a non-volatile storage space for applications and OS during a powered-down state of processor 300, among other operating software.

Processor 300 is generally intended to represent a computing system with which at least software 320 is deployed and executed in order to render or otherwise implement the operations described herein. However, processor 300 can also represent any computing system on which at least software 320 can be staged and from where software 320 can be distributed, transported, downloaded, or otherwise provided to yet another computing system for deployment and execution, or yet additional distribution.

The systems and operations discussed herein provide for dynamic assignment of computing resources, graphics processing resources, network resources, or storage resources to a computing cluster. The compute units are disaggregated from any particular cluster or compute unit until allocated by users of the system. Management processors can control the operations of the cluster and provide user interfaces to the cluster management service provided by software executed by the management processors. A cluster includes at least one "machine" or computing unit, while a compute unit include at least a processor element. Computing units can also include network interface elements, graphics processing elements, and storage elements, but these elements are not required for a computing unit.

Processing resources and other elements (graphics processing, network, storage, FPGA, or other) can be swapped in and out of computing units and associated clusters on-the-fly, and these resources can be assigned to other computing units or clusters. In one example, graphics processing resources can be dispatched/orchestrated by a first computing resource/CPU and subsequently provide graphics processing status/results to another compute unit/CPU. In another example, when resources experience failures, hangs, overloaded conditions, then additional resources can be introduced into the computing units and clusters to supplement the resources.

Processing resources can have unique identifiers assigned thereto for use in identification by the management processor and for identification on the PCIe fabric. User supplied software such as operating systems and applications can be deployed to processing resources as-needed when the processing resources are initialized after adding into a compute unit, and the user supplied software can be removed from a processing resource when that resource is removed from a compute unit. The user software can be deployed from a storage system that the management processor can access for the deployment. Storage resources, such as storage drives, storage devices, and other storage resources, can be allocated and subdivided among compute units/clusters. These storage resources can span different or similar storage drives or devices, and can have any number of logical units (LUNs), logical targets, partitions, or other logical arrangements. These logical arrangements can include one or more LUNs, iSCSI LUNs, NVMe targets, or other logical partitioning. Arrays of the storage resources can be employed, such as mirrored, striped, redundant array of independent disk (RAID) arrays, or other array configurations can be employed across the storage resources. Network resources, such as network interface cards, can be shared among the compute units of a cluster using bridging or spanning techniques. Graphics resources (e.g. GPUs) or FPGA resources can be shared among more than one compute unit of a cluster using NT partitioning or domain-based partitioning over the PCIe fabric and PCIe switches.

Figure 4:
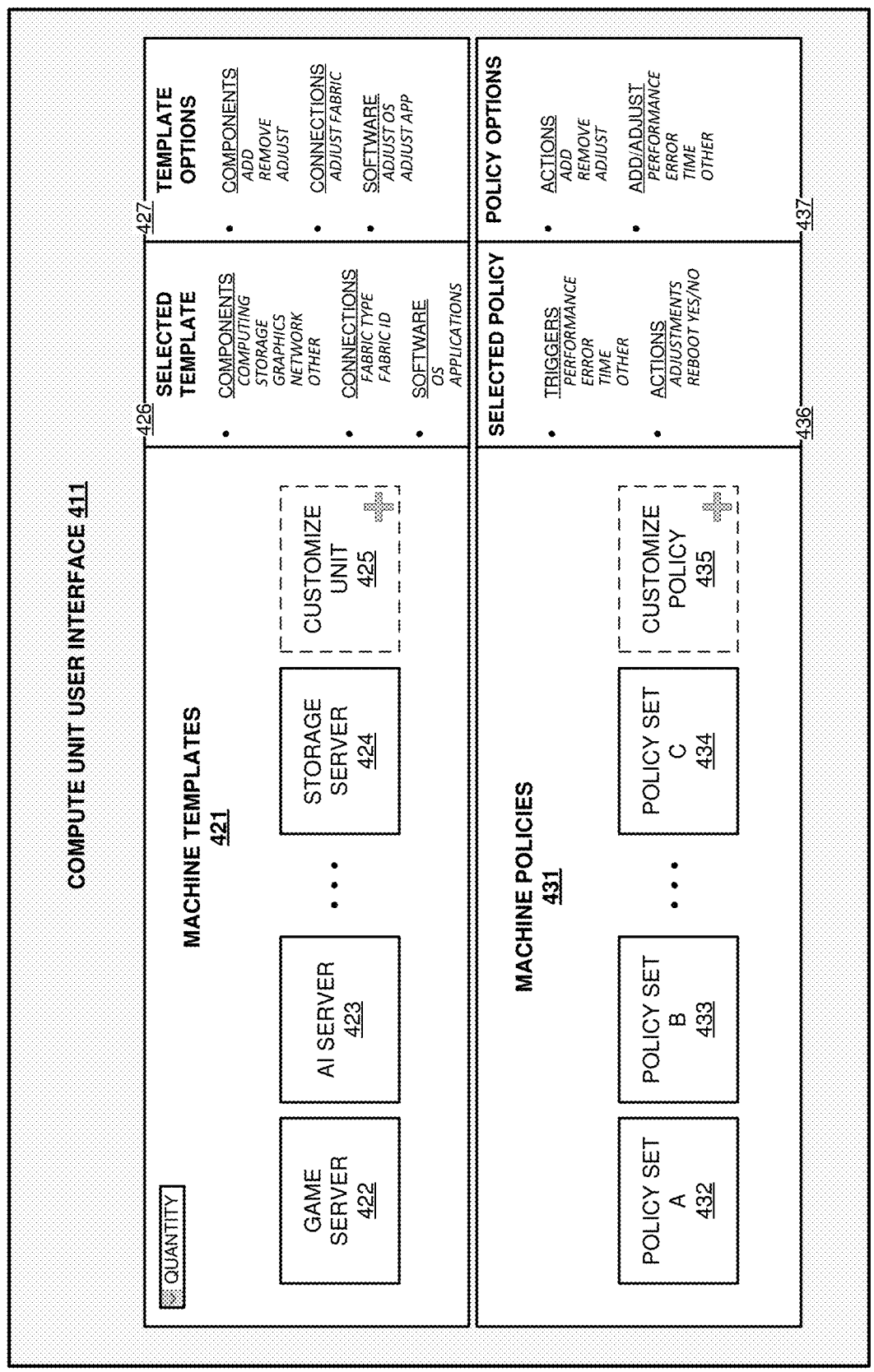
FIG. 4 is a block diagram illustrating a user interface that may be presented by the management processor in an implementation.
Figure 5:
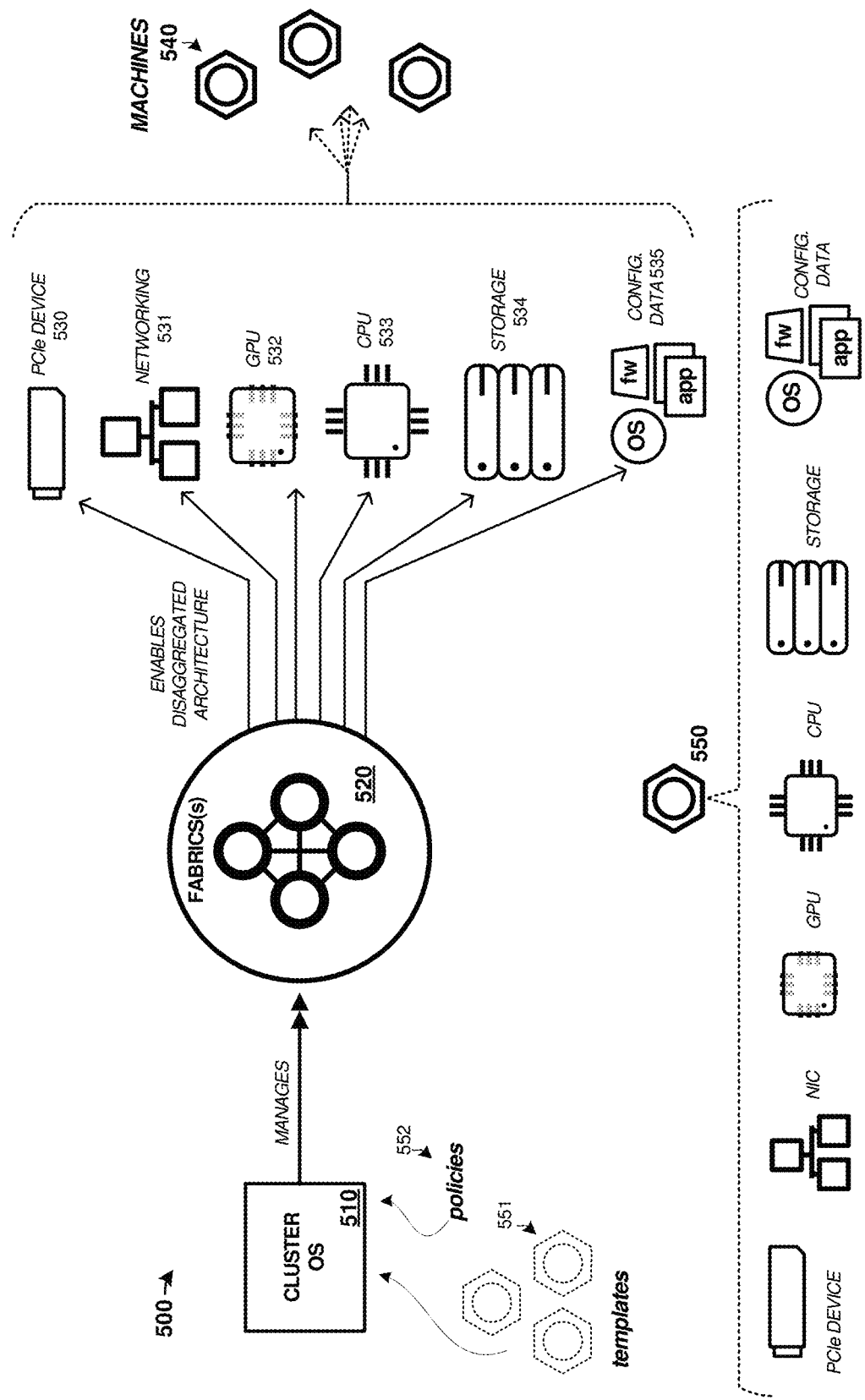
FIG. 5 illustrates example cluster management implementations.

FIG. 4 illustrates one implementation of a user interface to the computing services provided by a management processor/OS and associated communication fabrics. More particularly, FIG. 4 illustrates an example compute unit user interface 411. In some examples, compute unit user interface 411 can comprise one or more graphical user interfaces (GUIs), command line interfaces (CLIs), or application programming interfaces (APIs). Compute unit user interface 411 can be provided over graphical displays, network links, packet links, web interfaces, terminal interfaces, or other interfaces. Compute unit user interface 411 provides an interface for a user or operator create or deploy compute units, select or configure templates, and select or configure dynamic adjustment policies of compute units. One example user interface configuration is shown in FIG. 5, with compute unit user interface 411 including machine templates interface area 421, and machine policies interface area 431. In addition, region 426 includes information on a selected machine template and region 427 includes options for specifying or adjusting a machine template. Region 436 includes information on a selected policy, while region 437 includes options for specifying or adjusting a policy. In some examples, machine templates interface area 421 and machine policies interface area 431 may each include multiple selection levels. For example, an initial selection level in the template selection area may be a category, such as game servers, AI servers, storage servers, and the like. Once a category is selected, templates may be listed or subcategories may be presented for selection. Similar layering configurations may be used for the policy selection area. Moreover, multiple interface screens or views can be presented for templates and policies.

Template selection area 421 provides for user selection between multiple machine templates and customization or creation of machine templates. In FIG. 4, three example templates are shown, game server 422, artificial intelligence (AI) server 423, and storage server 424. Additionally, an option is presented to customize or create a machine template in element 425. Template selection area 421 includes selected machine template region 425 which may be used to view properties of any machine template selected by a user among templates 422-425. Template selection area 421 includes template options region 427 which may be used to alter, add, remove, or otherwise change the configuration, properties, or arrangement of a machine template. Template selection area 421 allows an operator to specify properties of a compute unit from scratch or to customize a compute unit based on a selected template. In one example, a user selects a machine template and enters a quantity of compute units to be built based on the template description. The user might want four machines built from a selected template description, and template selection area 421 allows for such selections.

Machine templates 422-425 each describe device attributes of associated physical computing components and a set of communication connections between a host processor and other components indicated among the associated physical computing components. The communication connections are specified as connection arrangements made over one or more communication fabrics comprising one or more communication switch circuits.

A hardware template might be created by a user based on a configuration of an existing compute unit. For example, compute unit user interface 411 can present indications of one or more compute units already established/implemented, and then present an option for creation of a new hardware template based on a selected compute unit among the one or more compute units already established. Responsive to receiving a user selection for creation of a new template based on the selected compute unit, a management processor can determine properties of the selected compute unit to generalize an arrangement of physical computing components into a specification for the new template. This new template can be named and a specification of the new template can be stored for subsequent usage in creation of a compute unit based on an arrangement indicated by the new template.

A specification of a new or user-created template might comprise indications or identities of the types of components to be included in a target compute unit built from the template, software configurations for deployment to the target compute unit (such as OS or applications), and connection properties for a corresponding communication fabric. The connection properties can include descriptions for creating logical domains in a communication fabric, fabric type descriptions, fabric identifiers, bus identifiers, vendor descriptors, and the like. For example, a first hardware template might specify components including a CPU of a certain type or capability, a GPU, a storage device having a particular amount of storage space, a quantity of NICs, and a particular operating system. Moreover, the first hardware template also specifies connection information, such as a type of communication fabric to be employed, preferred connection types among the components, minimum bandwidth/speed requirements, among other connection information. For example, communication connections might be specified as logical partitioning arrangements made over one or more Peripheral Component Interconnect Express (PCIe) communication fabrics comprising one or more PCIe switch circuits. In addition to hardware configurations of physical computing components, software configurations can be employed in machine templates. The templates discussed herein can each specify at least a software configuration to be deployed to an associated processing device. The software configuration might comprise one or more among operating systems, device drivers, and user applications, application state, user state or customizations, or other software.

A hardware template might be created by a user de novo or from scratch. Compute unit user interface 411 can present indications of physical computing component types includable in a new template. Compute unit user interface 411 can present indications of physical computing component types comprise a listing of categories of the physical computing component types organized by at least one among properties of the physical computing component types, vendor names, component function, and component capability, among other categories. In FIG. 4, physical computing component types can include processors/computing resources, storage resources, graphics processing resources, network interfacing resources, and other resources. Compute unit user interface 411 can receive selections made by a user for inclusion of one or more of the physical computing component types within the new template, and determine properties of the selections to generalize an arrangement of the one or more of the physical computing components into a specification for the new template. This new template can be named and a specification of the new template can be stored for subsequent usage in creation of a compute unit based on an arrangement indicated by the new template. In addition to hardware configurations of physical computing components, software configurations can be employed in machine templates. User-created templates discussed herein can each specify at least a software configuration to be deployed to an associated processing device. The software configuration might comprise one or more among operating systems, device drivers, and user applications, application state, user state or customizations, or other software.

Once a user selects a template for creation of a target compute unit, compute unit user interface 411 can instruct a management processor to establish the target compute unit. The management processor then allocates to the target compute unit a set of physical computing components according to the selected template and establishes connections within a communication fabric to communicatively couple the set of physical computing components. Until creation of the target compute unit, the machine templates represent possible or potential compute units. A user can then initiate create of the compute units according to specifications indicated in selected machine templates and in selected quantities. Moreover, the machine templates can further specify a software configuration to be deployed for the target compute unit. The software configuration might be deployed by a management processor by at least storing the software configuration in an allocated storage device accessible by an allocated processing device of the target compute unit. This deployment of the software configuration can occur responsive to initiation of the creation process for the compute unit. The management processor might store many different software configurations in a storage device separate from the target compute units, and deploy the software configurations from that separate storage device.

Machine policies interface area 431 provides for user selection between multiple dynamic machine adjustment policies and customization or creation of dynamic machine adjustment policies. In FIG. 4, three example predetermined policies are shown, policy set A 432, policy set B 433, and policy set C 435. Additionally, an option is presented to customize or create a machine template in element 435. The presented predetermined policy sets may be common to all the machine templates or may be policy sets relevant to a selected template or type of template. For example, after the game server template 422 is selected in area 421, the presented policy sets 432-434 may be populated with policy sets relevant to the game server template. Machine policies interface area 431 includes selected machine policy region 435 which may be used to view properties of any machine policy selected by a user among policies 432-435. Policy selection area 421 includes policy options region 437 which may be used to alter, add, remove, or otherwise change the configuration, properties, or arrangement of a machine policy. Policy selection area 421 allows an operator to specify policies for a compute unit from scratch or to customize a compute unit policy based on a selected existing policy. These policies can be applied to existing compute units, or attached to one or more machine templates for use when creating new compute units based on corresponding machine templates.

Selected policy display region 436 provides a listing of the current policy set for a selected compute unit or selected template. Region 436 includes a listing of triggers for each policy setting, where the triggers can be performance triggers, error triggers, time triggers, or other triggers. Region 436 also includes what actions are taken in response to the triggers, such as adjustments to physical computing components included in existing compute units, deployment of new compute units, and removal of compute units. If a user configures a policy, the user can choose the parameters by which a change is made. Moreover, options can be presented to allow a user to specify if a reboot or restart of the affected compute units should occur when an adjustment is made, or if a host processor should be left running with changes made on-the-fly. Changes comprising additions or removals of physical computing components into the compute units can be made using the communication fabric to alter logical connections, domain members, or logical partitioning. In PCIe examples, the logical partitioning of the PCIe fabric can be altered to add or remove the physical computing components, and also using PCIe attach/detach procedures with regard to a host processor If an IP/Ethernet fabric is employed, then addition or removal of physical computing components can occur using attach/detach processes configured over sockets or similar connection frameworks.

Changes, additions, or removals for a selected policy or new policy can be made in region 437. These changes can include additions, removals, or adjustments of policy triggers, coupling of policy triggers to policy actions, and selection of the trigger types. One trigger type can include a performance-based trigger which typically responds to performance ranges for a compute unit. A management processor can determine if a target compute unit has an excess of communication fabric connection activity. Based on the volume of connection information, changes to the target compute unit can be triggered. Other performance triggers, such as processor utilization levels, remaining storage capacity, graphics processing overhead, quantity of processing threads active, network traffic volume or available bandwidth, communication fabric volume, or other factors. Actions taken responsive to the performance-based triggers can include adding additional physical components into the target compute unit, such as additional processing capacity, storage capacity, graphics processing capacity, network interfacing capacity, or other changes. In some examples, a bottleneck may be found based on the type of fabric interconnection, such as a quantity of PCIe lanes, version of PCIe supported, or type of non-PCIe fabric employed. Wholesale migration of the target compute unit from physical components coupled over a first fabric type to a second fabric type might occur responsive to a trigger related to fabric activity saturation.

Another trigger type can include error-based triggers. These error-based triggers can comprise events which indicate that one or more physical or software components are presently failing to respond to computing activity, storage requests, or otherwise unresponsive or exhibiting error conditions. Responsive to the error triggers, a management processor can make changes to the target compute unit, such as rebooting/restarting, removing physical components which may have become unresponsive, migration of workloads to other physical components which are responsive, or adjustment of one or more operational parameters of the physical components. These operational parameters might include operating speeds, clock speeds, bus speeds, or other parameters.

Yet another trigger type can include time-based trigger. These time-based triggers can comprise timing events which are satisfied by either an absolute clock-based time metric, or relative timers. For example, compute units might be initiated/deployed responsive to specific time thresholds being met, such as to satisfy anticipated workload changes. For example, a night shift might correspond to a particular timeframe during the day, and additional physical computing components can be added into one or more target compute units responsive to a time of day. Conversely, another work shift might require fewer resources, and excess physical computing components can be removed from one or more target compute units responsive to a different time of day. In one example, a night shift might need 10 GPUs to handle associated workloads, while a day shift might only need 1 GPU and 2 SSDs. Triggers based on timing policies can be initiated to adjust affected compute units. Additional physical components can be pulled from free pools of components, while removed components can be returned to the pools.

Telemetry for the triggers can be monitored by a management processor, and responsive to the telemetry satisfying one or more thresholds or triggers, then adjustments to the target compute units can be automatically made according to the policies by the management processor. The telemetry can originate from one or more software or hardware elements deployed to the target compute unit. In one example, the telemetry originates from polling connection usage for the target compute unit. This connection usage can be determined from communication fabric activity information, which might arise from Intelligent Platform Management Interface (IPMI) elements for the compute unit or communication fabric. Telemetry might arise from activity monitors comprising software agents or daemons deployed to compute units. Telemetry can arise from sideband circuit or processor elements which monitor connection states or responsiveness metrics for devices and communication bus statistics for the devices. Telemetry can be received by polling associated monitoring elements or having telemetry data pushed to a management processor. For time-based triggers, the telemetry might comprise a system clock or one or more relative timers established to trigger events. Telemetry and associated operational statistics and policy configuration info and ranges can be stored in RAM or storage drive for use by the management processor.

FIG. 5 illustrates a disaggregated infrastructure 500 highlighting cluster management operating system (OS) 510 executed by a management processor and control of PCIe fabric 520. The management OS provides for the management, automation, and orchestration of PCIe devices that might include storage, memory, compute, GPU, FPGA, and network elements on PCIe-based fabrics. For example, PCIe device elements 530, storage elements 534, central processing elements (CPU) 533, graphics processing elements (GPU) 532, and network interface card (NIC) elements 531 are all able to be communicatively coupled over PCIe fabric 520. The PCIe fabric enables the disaggregated architecture by providing a partition-able communication medium for coupling the various elements into compute units and grouping the compute units into clusters.

To provide the disaggregated architecture, FIG. 5 illustrates a pool of free elements (530-534) that have not yet been assigned to a particular "machine" 540 or compute unit and operating systems and applications 535 present on the free pool of elements (530-534) or that may be deployed to storage devices for use in machines 540. The free elements are physically present in the associated system but remain idle or unassigned to a particular cluster/machine/compute unit. The management OS can select among the free elements and assign selected ones of the free elements to a machine. Requirements for the machine, such as what tasks the machine is being employed for, can be processed by the management OS to aid in selection of proper PCIe device elements among the free compute, GPU, FPGA, network, memory, and storage elements.

Users can interface with graphical or command-line interfaces that allow definition or indication of the requirements or other user targets. In the illustrated example, the user interface may allow present and allow the user to select hardware or software components 550 for machines 540 (e.g. compute units) that may specify hardware components to be allocated, as well as software and configuration information, for compute units created using the template. A user might select to create compute units based one or more machine templates 551, which employs components from among those shown for components 550. The user interface may further allow the user to customize or create machine templates 551. Furthermore, users can select, customize, or create one or more operational policies 551 which can dynamically alter the composition of created compute units.

The management OS can select among the free elements in response to the user requests. In some examples, the management OS may deploy configuration data 535 to storage devices to be used in a machine 540. In some examples, the management OS may respond user instructions that specify a particular configuration data 535 to deploy to a PCIe device. In other examples, the user instructions may include one or more fields that identify characteristics for configuration data 535 to be deployed and the management OS may be configured to select configuration data 535 that matches the identified characteristics. Further, in some examples, the user instructions may specify the PCIe device to receive configuration data 535 while, in other examples, the management OS may select the PCIe device, for example, based on user specifications. In addition, where the management OS selects configuration data 535 and PCIe device, the management OS may determine whether a free pool storage device already includes configuration data 535 such that the free pool PCIe device may be allocated to machine 540 without deployment operations.

As mentioned above, the management OS may operate to select configuration data 535 and free pool elements based on characteristics specified by the user. In such examples, the management OS can learn to recognize various requests for elements and select suitable elements from the free pool. For example, the management OS can recognize particular user-provided configuration data, such as operating systems, user-provided applications, or user-provided FPGA programming files, and select certain free elements to include in one or more machines based on that recognition. In one example, the operating system to be executed by a particular machine might be specified by a user to be a Linux operating system. Particular elements can be selected from the free pool to enable the machine to run the Linux operating system. User applications, operating systems, storage requirements, interface or traffic requirements, or other considerations can be used to select elements to include in each machine. In another example, a particular FPGA programming state or programming file might be selected for deployment to an FPGA device to be included in machine 540.

Figure 6:
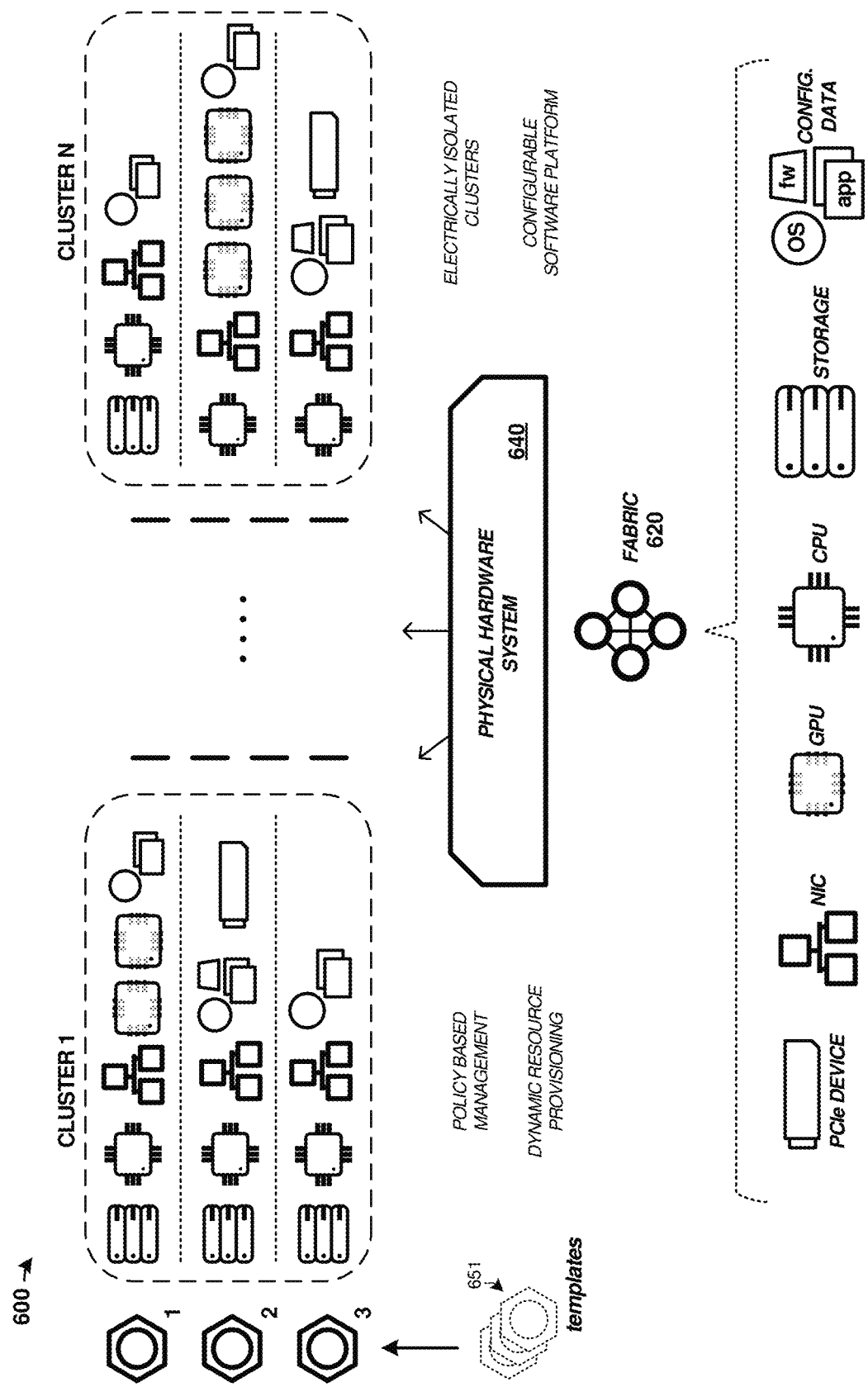
FIG. 6 illustrates example cluster management implementations.

FIG. 6 illustrates clustered operation during dynamic "bare metal" orchestration. Several machines are shown for each cluster, with associated machines comprised of physical elements/resources 640 such as CPUs, FPGAs, GPUs, NICs, storage drives, memory devices and other PCIe devices, along with software/configuration data directed or deployed thereto. The clusters are electrically isolated using PCIe fabric 620, and a management system can dynamically pull elements/resources from a pool of free elements, such as seen in FIG. 5. Thus, one or more physical enclosures, such as a rack-mounted hardware arrangement, can have many elements (i.e. several processors, FPGAs, network interfaces, GPUs, memory devices, storage drives, or other PCIe devices) and these elements can be allocated dynamically among any number of clusters and associated compute units/machines.

FIG. 6 illustrates example clusters, 1–N, with any number of clusters possible depending upon the availability of resources to be assigned to machines of the clusters. Although each cluster is shown to have three machines, it should be understood that more or less than three machines per cluster can be utilized. Moreover, each machine in each cluster indicates example elements assigned thereto.

These assigned elements can change dynamically according to dynamic adjustment policies, user commands, user instructions, preemptive or predictive allocation, idle/spin-down based removal, or other considerations. One or more management services or control processors can be configured to perform this establishment and alteration of machines and clusters using the PCIe fabric as a medium to couple the various elements dynamically. For example, the management services or control processors may dynamically adjust the components of the machines based on dynamic adjustment policies included in machine templates 651 or as specified by the user. For example, in the case of a data analysis compute unit, the selected machine template may include a dynamic adjustment policy indicating a usage threshold at which an additional GPU module is to be added to the compute unit. In such a case, the management services or control processors may determine that the compute unit has exceeded the usage threshold and dynamically pull a GPU module from the pool of free elements and add the GPU module to the compute unit.

Figure 7:
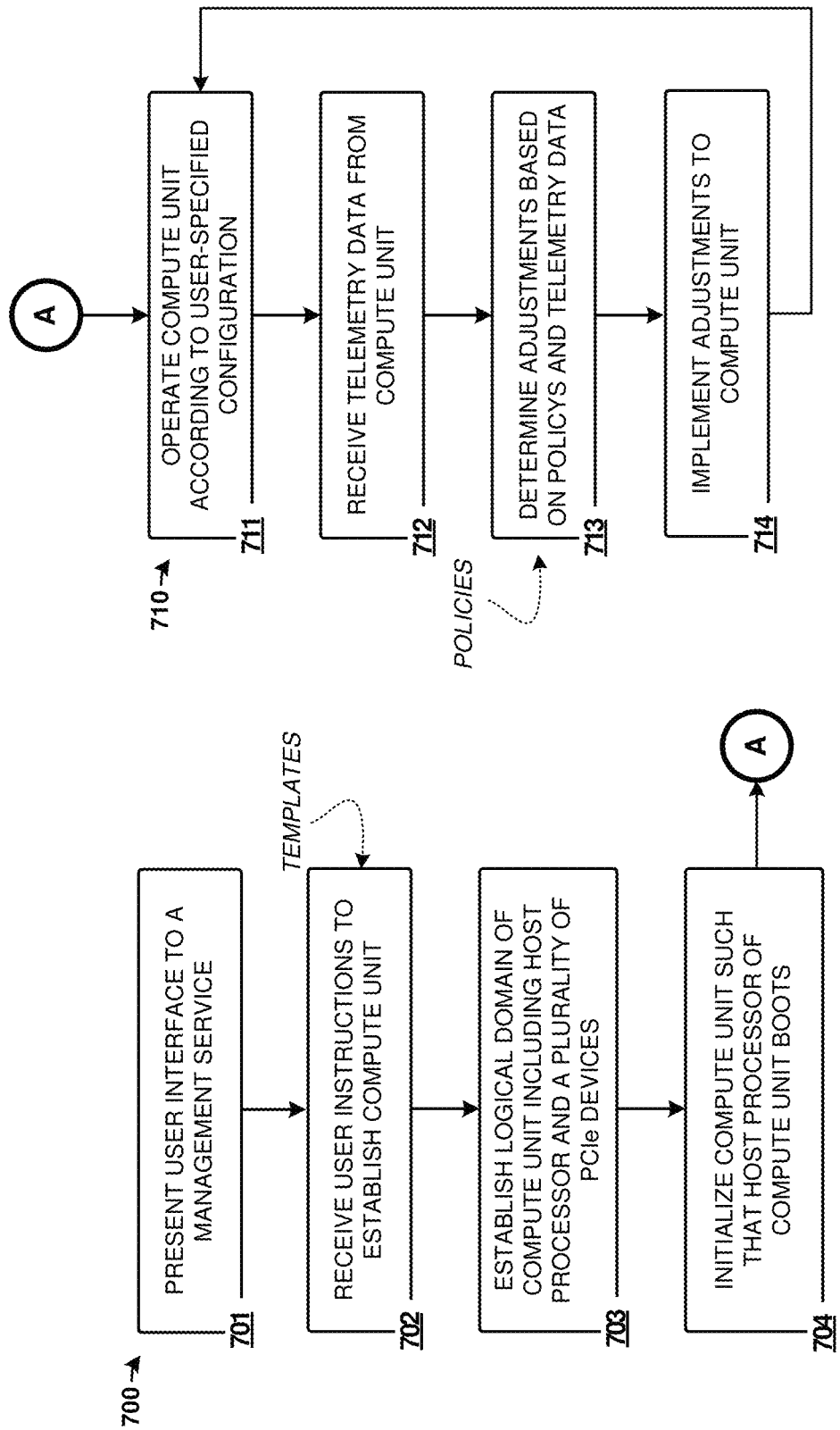
FIG. 7 includes a flow diagram that illustrates an operational example of compute units in an implementation.

FIG. 7 includes a flow diagram that illustrates operational example 700 of functionality to establish compute units and perform dynamic adjustment based on policies in compute units for any of the systems discussed herein, such as for computing platform 100 of FIG. 1, system 200 of FIG. 2, or processor 300 of FIG. 3. In FIG. 7, operations will be discussed in context of elements of FIGS. 1 and 2, although the operations can also apply to any of the examples herein.

In FIG. 7, management processor 110 presents (701) a user interface, such as compute unit creation interface 411. This user interface can comprise a GUI or other user interfaces through which users may select and configure templates and dynamic adjustment policies of compute units. Management processor 110 may receive (702) user instructions to establish a compute unit, for example, based on the entry to the compute unit creation interface. In some examples, the user instructions may be received via a graphical user interface (GUI) or command line interface (CLI) as part of user instructions to establish a cluster or may be received in instructions to establish a specific compute unit. In the event free resources or physical components to form a compute unit are not available, management processor 110 can record the inability to fulfill the template in an error log for the user. The user might get one or more notifications via the associated user interface indicating an error and what resources were not sufficient to establish the compute unit. Management processor 110 may establish a request queue which delays creation of compute units until sufficient resources are available or free. Once sufficient resources are free, then management processor 110 can proceed to establish the compute unit.

The instructions can indicate to create a compute unit using one or more specified physical components and software components. A user or operator might issue instructions to build a compute unit composed of specific components or types of components, which can be selected from lists, categories, menus, and the like presented in the user interface. Command line instructions might indicate components via a naming convention and parameter-based instruction. A user might be presented with one or more machine templates which indicate pre-selected arrangements of components and configurations to create at least one compute unit. A user might develop one or more new machine templates or adjust existing machine templates. In this manner, a user or operator has several pathways from which to initiate creation of a compute unit, namely a customized compute unit, template-based compute unit, or combination thereof.

Upon receiving the user instructions to establish the compute unit, management processor 110 may establish (703) connections via a logical domain in a communication fabric that includes host processor 120 and a plurality of devices (e.g. storage devices, GPUs, NICs, FPGAs, etc. . . . ). Various examples for establishing logical domains in PCIe fabrics and other communication fabrics are discussed herein. Referring to these examples, these connections may operate to add devices into a logical domain from a free pool of devices. Establishing a logical PCIe domain may provide PCIe physical layer visibility between the PCIe devices of the domain. Management processor 110 may then initialize (704) the compute unit such that the host processor of the compute unit boots and begins to operate. A software configuration, such as operating system, user applications, system applications, virtualized components, telemetry elements, device drivers, customizations, or other software configurations can be deployed to the compute unit for usage by a processor of the compute unit. The processor might be designated as a host processor which executes an operating system and applications for the compute unit. Other processors can be included in each compute unit that perform similar tasks or instead act as backup processors or subordinate processors.

FIG. 7 also illustrates operations 710, such as for a user or management processor to monitor or modify operation of an existing compute units. An iterative process can occur where a management processor can monitor and modify the physical components of the compute units and physical components can be added, removed or migrated.

In operation 711, a compute unit is operated according to specified configurations and user instructions, such as those discussed in operations 701-704. The operation of the compute unit can include executing user operating systems, user applications, content server operations, database operations, user storage processes, graphics processing operations, machine learning operations, and artificial intelligence operations, among other user operations. During operation of the compute unit, telemetry is received (712) by a management processor from the various elements comprising the compute unit, such as PCIe switch elements, processing elements, storage elements, network interface elements, and other elements, including system and user software executed by the processing elements. The telemetry data can be analyzed by the management processor against one or more dynamic adjustment policies. These policies can indicate triggers, events, or thresholds which prompt changes to the compute unit via dynamic adjustments.

The adjustments made to the compute unit can comprise changes to the composition of devices employed in the compute unit. For example, one or more components can be added, removed, or reconfigured based on the adjustments. These changes can be made to bring the operation of the compute unit to within a desired operational range according to the dynamic adjustment policies. For example, when storage levels of a storage device reach threshold levels indicated in the dynamic adjustment policies, then additional storage devices can be brought into the compute unit. When processor utilization exceeds a target level, then the dynamic adjustment policies can indicate that additional processing capacity be brought into the compute unit. Conversely, when excess capacity is detected for a compute unit, then a portion of that capacity can be removed from the compute unit and returned to a free pool of resources for use by other compute units. The dynamic changes can be achieved by altering the logical partitioning within the communication fabric, such as altering domain connections within a PCIe fabric. A reboot or restart of the compute unit may be employed in some examples to allow additional components or devices to be recognized for use by the compute unit. However, some changes might be able to be accomplished without reboot, depending partially upon the nature of the change and the capabilities of the communication fabric, operating system, device drivers, and the like. For example, storage capacity might be added without reboot of an operating system by 'hot' addition (or removal) of storage devices for the compute unit. Once the changes to the compute units are determined, then the management processor can implement (713) the adjustments by aforementioned changes in active/inactive components, communication fabric alterations, and possible restarts/reboots.

Figure 8:
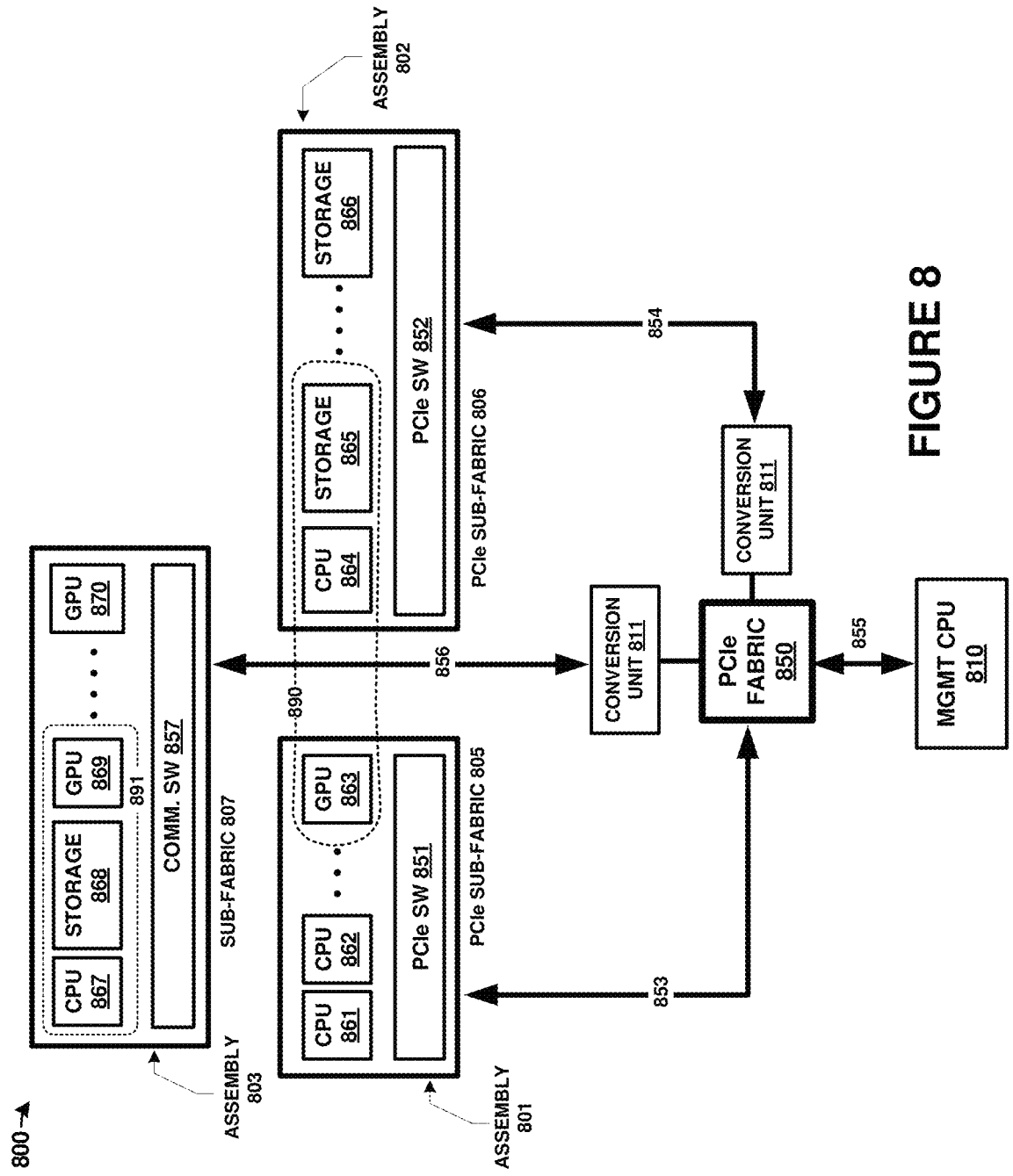
FIG. 8 is a diagram illustrating components of a computing platform in an implementation.

FIG. 8 is presented to illustrate example operations in the context of a computing platform. In FIG. 8, computing platform 800 is presented and performs operations 910 and 920 of FIG. 9. Computing platform 800 includes a management CPU 810, PCIe fabric 850, as well assemblies 801-803 that house a plurality of associated CPUs, GPUS and storage devices 861-870, as well as a PCIe switches 851-852 and communication switches 857. Assemblies 801-803 might comprise any chassis, rackmount or "just a box of disks" (JBOD) or "just a bunch of logic" (JBOL) assemblies. In the current example, the assembly 801 utilizes a first communication protocol and associated PCIe version in a first PCIe sub-fabric 805, the assembly 802 utilizes a second communication protocol and associated PCIe version in a second PCIe sub-fabric 806 and assembly 803 utilizes a third communication protocol, such as Gen-Z, CXL, or a different version of the PCIe protocol in a third sub-fabric 807. In some examples, the PCIe fabric 850 may utilize the first communication protocol and associated PCIe version. A number of PCIe links interconnect the elements of FIG. 8, namely PCIe links 853-856. In some examples, PCIe link 855 may comprise a special control/management link that enables administrative or management-level access of control to PCIe fabric 850.

Each protocol can be its own "sub-fabric" box coupled through the conversion element to the PCIe fabric 850. The conversion units may couple via compatible cabling/connectors to a fabric control box, such as a top of rack switch, within PCIe fabric 850 which can interface to each individual sub-fabric or box over the associated protocol/link, and then interwork/convert traffic among them. Conversion units 810-811 may operate to act as interfaces between PCIe devices utilizing the different versions or communication protocols. Data transfers detected may be "trapped" and translated or converted to the version or communication protocol utilized by the destination device by the conversion unit circuitry and then routed to the destination device. More particularly, conversion unit 810 may convert a first communication protocol to a second communication protocol, and vice versa, which may entail different physical, link, or transport layers. Similarly, conversion unit 810 may convert a first communication protocol to a third communication protocol, and vice versa, which may entail different physical, link, or transport layers.

Figure 9:
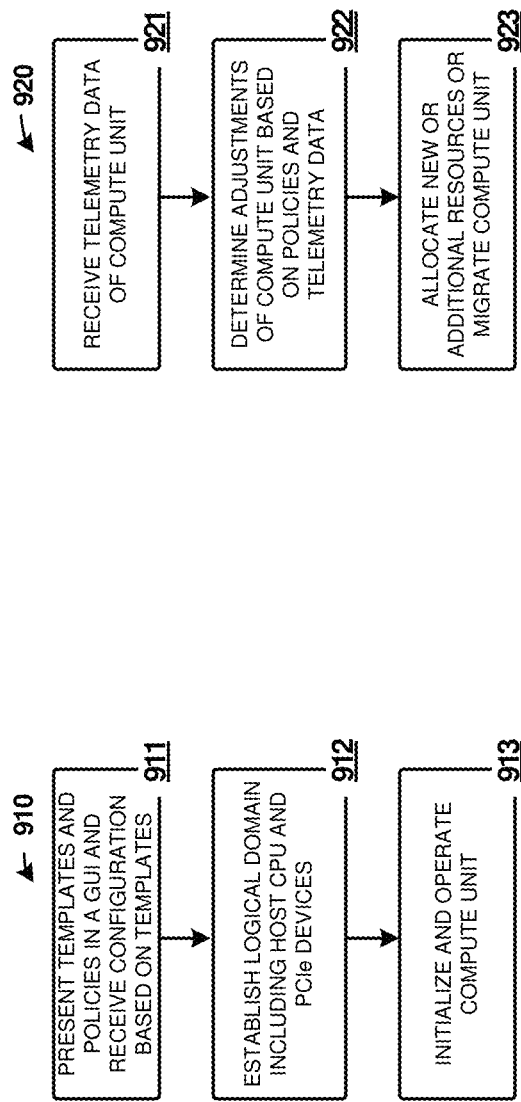
FIG. 9 includes flow diagrams that illustrate operational examples of a management processor and computing system in an implementation.

Turning to the operation of the computing platform 800, management CPU 810 performs the operations 910 and 920 in FIG. 9. Operations 910 establish a compute unit based at least on machine templates and machine policies. In operation 911, management CPU 810 presents a compute unit creation user interface. In one example, management CPU 810 can present a user interface indicating a plurality of machine templates each specifying at least a predefined arrangement of physical computing components for inclusion in compute units. The plurality of physical computing components can include central processing units (CPUs), graphics processing units (GPUs), data storage devices, field-programmable gate arrays (FPGAs), network interface modules (NICs), specialized devices, or other devices coupled over a shared communication fabric. The elements of FIG. 8 illustrate several such physical components which are segregated into various sub-fabrics but are all communicatively coupled by PCIe fabric 850.

The plurality of templates each describe device attributes of associated physical computing components and a set of communication connections between a host processor and other components indicated among the associated physical computing components. When a compute unit is formed, a particular CPU or processor of the compute unit can be designated as a host processor or main processor. This host processor typically will execute an operating system for the compute unit to function as a computing machine. Various physical computing components will be communicatively coupled to the host processor using logical partitioning in a communication fabric, such that the host processor can boot into an operating system and have visibility to the physical computing components as if the host processor and physical computing components were a discrete computing machine. In addition to device attributes of associated physical computing components, the plurality of templates can also each specify a software configuration to be deployed to an associated device of the compute unit, such as to a host processor, storage device, FPGA, or other device that can accept or store software configurations. The software configuration can comprise one or more operating systems, device drivers, and user applications.

Machine policies can also be employed for dynamic adjustment of compute units, with or without the use of machine templates. When policies are employed, management CPU 810 can present a user interface indicating a plurality of policies specifying operational triggers and responsive actions for altering composition of compute units each comprising a plurality of physical computing components. The plurality of policies each can comprise operational triggers selected from among performance triggers, error triggers, and time triggers. Responsive to meeting criteria specified for the operational triggers, the plurality of policies indicate to management CPU 810 to add, remove, or alter one or more physical computing components from corresponding compute units. Management CPU 810 can also provide for creation of new machine policies or modification of existing machine policies. In one example, management CPU 801 can establish a user interface presenting an option for creation of a new policy that presents indications of one or more triggers and one or more actions responsive to the one or more triggers for inclusion in a new policy. The user interface can receive user selections among the one or more triggers and the one or more actions for inclusion in the new policy. Management CPU 801 can store a specification of the new policy for subsequent usage in adjusting composition of a compute unit after deployment of the compute unit.

Management CPU 810 can receive user instructions to establish a target compute unit based on a machine template and dynamic adjustment policies. The user interface can receive a user selection indicating a selected machine template among a plurality of machine templates to form a target compute unit. One a user selects a machine template for implementation into a compute unit, management CPU 810 allocates to the target compute unit a set of physical computing components according to the selected template. This allocation can include removing the physical computing components from a pool of free components for usage in the target compute unit.

In operation 912, management CPU 810 establishes the target compute unit based at least on logical partitioning within a communication fabric communicatively coupling the set of physical computing components of the target compute unit. The logical partitioning comprises one or more communication connections that are specified as connection arrangements made over one or more communication fabrics comprising one or more communication switch circuits. In one example, the communication connections are specified as logical partitioning arrangements made over one or more PCIe communication fabrics comprising one or more PCIe switch circuits. For example, management CPU 810 can establish logical domain 890 or 891 within a PCIe communication fabric for the target compute unit. This may include allocating physical resources for a target compute unit including CPU 867, storage device 868, and GPU 869 for domain 891 which forms a first target compute unit. Likewise, this may include allocating physical resources for a target compute unit including GPU 863, CPU 864, and storage device 865 for domain 890 which forms a second target compute unit. Management CPU 810 may establish logical domain 891 across PCIe fabric 850 comprising communication switches 857. Management CPU 810 may establish logical domain 890 across PCIe fabric 850 comprising PCIe switches 851-852. Logical domain 890 may employ conversion unit 811 when PCIe switch 852 employs a different protocol or PCIe version than PCIe switch 851 or PCIe fabric 850.

Management CPU 810 can further establish the target compute unit by deploying a software configuration to the target compute unit. This software configuration deployment might comprise storing the software configuration in an allocated storage device accessible by a host processor allocated to the target compute unit. With this stored software configuration, the host processor can boot into an associated operating system or other operational configuration. This software configuration deployment might comprise programming a programmable logic device (such as an FPGA) or storing the software configuration in an allocated storage device accessible by a programmable logic device allocated to the target compute unit. Management CPU 810 might deploy telemetry elements to the compute unit or interface with existing telemetry elements of the compute unit or communication fabric. For example, responsive to users deploying a target compute unit, management CPU 810 can deploy one or more telemetry elements to the target compute unit. The one or more telemetry elements can monitor operational properties of the target compute unit and provide the telemetry data to the management CPU 810 for use in dynamic adjustment of the target compute unit using one or more applicable policies.

In operation 913, CPU 864 (designated in this example as a host CPU) of the target compute unit boots into an operating system designated by a software configuration and begins to operate. The connected resources for the target compute unit appear to the host processor as native devices. Depending upon the fabric type and associated connections, these connected resources might be PCIe connected devices or connected by other fabrics. For example, an NVMe-over-fabric device can be employed using an IP stack to discover NVMe devices with NVMe-to-Ethernet driver on the host processor.

Continuing with further operation of the computing platform 800, management CPU 810 may perform operations 920. In operation 921, management CPU 810 may receive telemetry data regarding physical computing components or software operations of various compute units. This telemetry data can originate from host processors which execute monitoring software, such as telemetry elements, activity monitors, daemons, agents, and the like, and transfer telemetry data to management CPU 810. This telemetry data might arise from telemetry elements comprising IPMI elements for the compute unit or communication fabric. Other sideband monitoring circuitry and telemetry circuitry can also be employed and report telemetry to management CPU 810.

In operation 922, management CPU 810 analyzes the telemetry data and determines dynamic adjustments for one or more compute units based on applicable machine policies and results of the analysis. As discussed above, various triggers can be employed, such as performance-based, error-based, or time-based triggers, among others. The policies can not only set threshold levels or activity-based triggers for the telemetry data, but also actions to take in response to the triggers being satisfied. The actions can include alterations to the composition of existing compute units, addition of additional compute units to support a given application or workload, or removal of elements back into a free pool of elements.

In operation 923, management CPU 810 may then interface with the affected compute units or communication fabric circuitry to allocate new or additional resources, migrate workloads to other compute units, or migrate the compute unit to other physical computing components or fabric types. Management CPU 810 may alter the composition of the compute units by at least changing logical partitioning among the corresponding set of physical computing components to add, remove, or alter at least one among the set of physical computing components from the compute unit. Management CPU 810 may then reboot a processor component remaining in the set of physical computing components. In one example of operations 921-923, management CPU 810 may receive and analyze telemetry data from a target compute unit and determine that a processor utilization has exceeded a threshold for a specified period during a specified time of day. In response, management CPU 810 may cause the compute unit to migrate a workload to another processor with additional processing capability, or add an additional processor into the compute unit for workload sharing with an existing processor. The policy may further specify that during specified high utilization times of day, when utilization reaches a threshold and remains above that threshold for more than a minimum period of time, then a compute unit should be migrated to physical computing components coupled over a higher-performance communication fabric, such as Gen-Z or CXL instead of PCIe.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the present disclosure. Those skilled in the art will also appreciate that the features described above can be combined in various ways to form multiple implementations. As a result, the invention is not limited to the specific implementations described above, but only by the claims and their equivalents.

What is claimed is:

1. A method, comprising:
    presenting a user interface indicating a plurality of templates each specifying at least a predefined arrangement of physical computing components for inclusion in compute units, wherein the physical computing components comprise one or more among central processing units (CPUs), graphics processing units (GPUs), storage devices, field-programmable gate arrays (FPGAs), and network interface modules each separately coupled to at least a communication fabric such that the physical computing components can be arbitrarily arranged into the compute units;
    receiving a user selection indicating a selected template among the plurality of templates to form a target compute unit;
    allocating to the target compute unit a set of physical computing components according to the selected template; and
    instructing a management entity to establish the target compute unit based on altering logical partitioning within at least the communication fabric communicatively coupling the set of physical computing components of the target compute unit.

2. The method of claim 1, wherein the plurality of templates each describe device attributes of associated physical computing components and a set of communication connections between a host processor and other components indicated among the associated physical computing components.

3. The method of claim 2, wherein the communication connections are specified as connection arrangements made over one or more communication fabrics comprising one or more communication switch circuits.

4. The method of claim 3, wherein the one or more communication fabrics comprise at least one among a Peripheral Component Interconnect Express (PCIe) communication fabric, Compute Express Link (CXL) fabric, and Ethernet fabric.

5. The method of claim 1, further comprising:
    in the user interface, presenting indications of one or more compute units already established;
    in the user interface, presenting an option for creation of a new template based on a selected compute unit among the one or more compute units already established;
    responsive to receiving a user selection for creation of a new template based on the selected compute unit, determining properties of the selected compute unit to generalize an arrangement of physical computing components into a specification for the new template; and
    storing the specification of the new template for subsequent usage in creation of a compute unit based on an arrangement indicated by the new template.

6. The method of claim 1, further comprising:
    in the user interface, presenting indications of physical computing component types includable in a new template;
    receiving selections made by a user for inclusion of one or more of the physical computing component types within the new template;
    determining properties of the selections to generalize an arrangement of the one or more of the physical computing components into a specification for the new template; and storing the specification of the new template for subsequent usage in creation of a compute unit based at least on the arrangement indicated by the new template.

7. The method of claim 6, wherein presenting the indications of the physical computing component types comprise listing categories of the physical computing component types organized by at least one among properties of the physical computing component types, vendor names, component function, and component capability.

8. The method of claim 1, wherein the plurality of templates each specify at least a software configuration to be deployed to an associated processing device, wherein the software configuration comprises one or more among operating systems, device drivers, and user applications; and
instructing the management entity to establish the target compute unit by further specifying the software configuration to be deployed for the target compute unit, wherein the software configuration is deployed by at least storing the software configuration in an allocated storage device accessible by an allocated processing device of the target compute unit.

9. An apparatus, comprising:
one or more computer readable storage media; and
program instructions stored on the one or more computer readable storage media that, based on being read and executed by a processing system, direct the processing system to at least:
present a user interface indicating a plurality of templates each specifying at least a predefined arrangement of physical computing components for inclusion in compute units, wherein the physical computing components comprise one or more among central processing units (CPUs), graphics processing units (GPUs), storage devices, field-programmable gate arrays (FPGAs), and network interface modules each separately coupled to at least a communication fabric such that the physical computing components can be arbitrarily arranged into the compute units;
receive a user selection indicating a selected template among the plurality of templates to form a target compute unit;
allocate to the target compute unit a set of physical computing components according to the selected template; and
instruct a management entity to establish the target compute unit based on logical partitioning within at least the communication fabric communicatively coupling the set of physical computing components of the target compute unit.

10. The apparatus of claim 9, wherein the plurality of templates each describe device attributes of associated physical computing components and a set of communication connections between a host processor and other components indicated among the associated physical computing components.

11. The apparatus of claim 10, wherein the communication connections are specified as connection arrangements made over one or more communication fabrics comprising one or more communication switch circuits.

12. The apparatus of claim 11, wherein the one or more communication fabrics comprise at least one among a Peripheral Component Interconnect Express (PCIe) communication fabric, Compute Express Link (CXL) fabric, and Ethernet fabric.

13. The apparatus of claim 9, comprising further program instructions, based on being executed by the processing system, direct the processing system to at least:
in the user interface, present indications of one or more compute units already established;
in the user interface, present an option for creation of a new template based on a selected compute unit among the one or more compute units already established;
responsive to receiving a user selection for creation of a new template based on the selected compute unit, determine properties of the selected compute unit to generalize an arrangement of physical computing components into a specification for the new template; and
store the specification of the new template for subsequent usage in creation of a compute unit based on an arrangement indicated by the new template.

14. The apparatus of claim 9, comprising further program instructions, based on being executed by the processing system, direct the processing system to at least:
in the user interface, present indications of physical computing component types includable in a new template;
receive selections made by a user for inclusion of one or more of the physical computing component types within the new template;
determine properties of the selections to generalize an arrangement of the one or more of the physical computing components into a specification for the new template; and
store the specification of the new template for subsequent usage in creation of a compute unit based at least on the arrangement indicated by the new template.

15. The apparatus of claim 14, comprising further program instructions, based on being executed by the processing system, direct the processing system to at least:
present the indications of the physical computing component types by at least listing categories of the physical computing component types organized by at least one among properties of the physical computing component types, vendor names, component function, and component capability.

16. The apparatus of claim 9, wherein the plurality of templates each specify at least a software configuration to be deployed to an associated processing device, wherein the software configuration comprises one or more among operating systems, device drivers, and user applications; and
comprising further program instructions, based on being executed by the processing system, direct the processing system to at least:
instruct the management entity to establish the target compute unit by further specifying the software configuration to be deployed for the target compute unit, wherein the software configuration is deployed by at least storing the software configuration in an allocated storage device accessible by an allocated processing device of the target compute unit.

17. A computing system, comprising:
a user interface configured to present indications of a plurality of templates each specifying at least a predefined arrangement of physical computing components for inclusion in compute units, wherein the physical computing components comprise one or more among central processing units (CPUs), graphics processing units (GPUs), storage devices, field-programmable gate arrays (FPGAs), and network interface modules each separately coupled to at least a communication fabric such that the physical computing components can be arbitrarily arranged into the compute units;

the user interface configured to receive a user selection indicating a selected template among the plurality of templates to form a target compute unit;

a management processor configured to allocate to the target compute unit a set of physical computing components according to the selected template; and the management processor configured to establish the target compute unit based at least on logical partitioning within at least the communication fabric communicatively coupling the set of physical computing components of the target compute unit.

18. The computing system of claim 17, wherein the plurality of templates each specify at least a software configuration to be deployed to an associated processing device, wherein the software configuration comprises one or more among operating systems, device drivers, and user applications; and comprising:

the management processor configured to establish the target compute unit by further specifying the software configuration to be deployed for the target compute unit, wherein the software configuration is deployed by at least storing the software configuration in an allocated storage device accessible by an allocated processing device of the target compute unit.

* * * * *